United States Patent
Yoneda et al.

(10) Patent No.: US 9,843,683 B2
(45) Date of Patent: Dec. 12, 2017

(54) CONFIGURATION METHOD FOR SOUND COLLECTION SYSTEM FOR MEETING USING TERMINALS AND SERVER APPARATUS

(71) Applicant: Panasonic Intellectual Property Corporation of America, Torrance, CA (US)

(72) Inventors: Aki Yoneda, Hyogo (JP); Tsuyoki Nishikawa, Osaka (JP); Atsushi Sakaguchi, Osaka (JP)

(73) Assignee: PANASONIC INTELELCTUAL PROPERTY CORPORATION OF AMERICA, Torrance, CA (US)

( * ) Notice: Subject to any disclaimer, the term of this patent is extended or adjusted under 35 U.S.C. 154(b) by 50 days.

(21) Appl. No.: 14/686,811

(22) Filed: Apr. 15, 2015

(65) Prior Publication Data

US 2015/0312419 A1   Oct. 29, 2015

(30) Foreign Application Priority Data

Apr. 24, 2014   (JP) ................................ 2014-090001

(51) Int. Cl.
   *H04M 3/56*   (2006.01)
   *H04W 4/16*   (2009.01)

(52) U.S. Cl.
   CPC ............. *H04M 3/568* (2013.01); *H04W 4/16* (2013.01); *H04M 2207/18* (2013.01)

(58) Field of Classification Search
   CPC ............. G06F 21/606; G06F 17/30011; G06F 17/30026; G06F 17/30743; G06F 17/30749; G06F 17/3082; G06F 17/30867; G06F 19/3418; G06F 3/165; G06F 17/2775; G06F 17/30787; H04M 1/72569; H04M 3/4878; H04M 1/72572; H04M 3/2281; H04M 3/51; H04M 3/568; H04M 1/6066; H04M 2201/41; H04M 2250/74; H04M 3/42042; H04M 3/42221; H04M 3/4936; H04N 21/812; H04N 21/2187; H04W 88/02; H04W 4/021; H04W 4/025; H04W 4/08; H04W 4/16
   See application file for complete search history.

(56) References Cited

U.S. PATENT DOCUMENTS

| | | | | |
|---|---|---|---|---|
| 2004/0203350 | A1* | 10/2004 | Shultz | ................... G06Q 10/10 455/41.1 |
| 2009/0181659 | A1* | 7/2009 | Stalnacke | .......... G06Q 10/1093 455/416 |
| 2013/0344851 | A1* | 12/2013 | Brdiczka | ............... G01S 5/0278 455/414.1 |

OTHER PUBLICATIONS

"Stressless Tele-meetings with Add-on Smartphones" (URL:http://labevent.ecl.ntt.co.jp/forum2014/elements/pdf_jpn/V-1_j.pdf).

* cited by examiner

*Primary Examiner* — George Eng
*Assistant Examiner* — Jing Gao
(74) *Attorney, Agent, or Firm* — Greenblum & Bernstein, P.L.C.

(57) ABSTRACT

A configuration method for a sound collection system for a meeting using a plurality of terminals, the system obtaining speech from the terminals. The method includes: receiving external sounds from the respective terminals as collected-sound data, the external sounds being collected by the respective terminals; and determining a meeting to which each of the terminals belongs, in accordance with a degree of similarity between the collected-sound data. At least one of the receiving the collected-sound data and the determining the meeting is performed by a processor.

9 Claims, 20 Drawing Sheets

| MEETING | TERMINAL |
|---------|----------|
| MEETING 1 | TERMINAL A, TERMINAL B, TERMINAL C |
| MEETING 2 | TERMINAL D, TERMINAL E |
| MEETING 3 | TERMINAL F, TERMINAL G, TERMINAL H |

CONFIGURATION METHOD FOR SOUND COLLECTION SYSTEM FOR MEETING USING TERMINALS AND SERVER APPARATUS

BACKGROUND

1. Technical Field

The present disclosure relates to a configuration method for a sound collection system that uses a plurality of terminals, such as smartphones, as microphones for a meeting and to a server apparatus.

2. Description of the Related Art

A remote meeting (or a video teleconference) in which the sound of utterances of participants in a meeting is collected and is transmitted to another meeting at a remote place has been held from a long time ago. Also, systems for automatically creating minutes by collecting the sound of utterances in a meeting and performing speech recognition thereon have been long known, and various approaches have been conceived.

In many of those systems, dedicated devices are used, and typically, meeting rooms in which such devices are installed are used. Such systems, therefore, are not readily available in typical meeting rooms in which dedicated devices are not installed.

In recent years, a large number of people have been using smartphones on a daily basis. Since smartphones are general-purpose computers that can connect to a network on their own, that can run external application programs, and that have cameras and microphones, there is a growing tendency to actively utilize the smartphone for various purposes.

In the so-called web meeting system in the remote meeting systems, smartphones are also increasingly used as terminals. An idea of connecting smartphones to a remote meeting system and using the microphones of the smartphones to collect all utterances of participants has been disclosed, as in URL: http://labevent.ecl.ntt.co.jp/forum2014/elements/pdf_jpn/V-1_j.pdf, (hereinafter referred to as "Non-Patent Document 1").

SUMMARY

In one general aspect, the techniques disclosed here feature a configuration method for a sound collection system for a meeting using a plurality of terminals, the system obtaining speech from the terminals. The method includes: receiving external sounds from the respective terminals as collected-sound data, the external sounds being collected by the respective terminals; and determining a meeting to which each of the terminals belongs, in accordance with a degree of similarity between the collected-sound data. At least one of the receiving the collected-sound data and the determining the meeting is performed by a processor.

According to the present disclosure, by utilizing collected-sound data resulting from sound collection performed using terminals brought into a meeting room by individuals, it is possible to easily determine a meeting to which terminals that participate in the meeting belong, without having to install a special dedicated device in the meeting room.

It should be noted that general or specific embodiments may be implemented as a system, an apparatus, a device, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
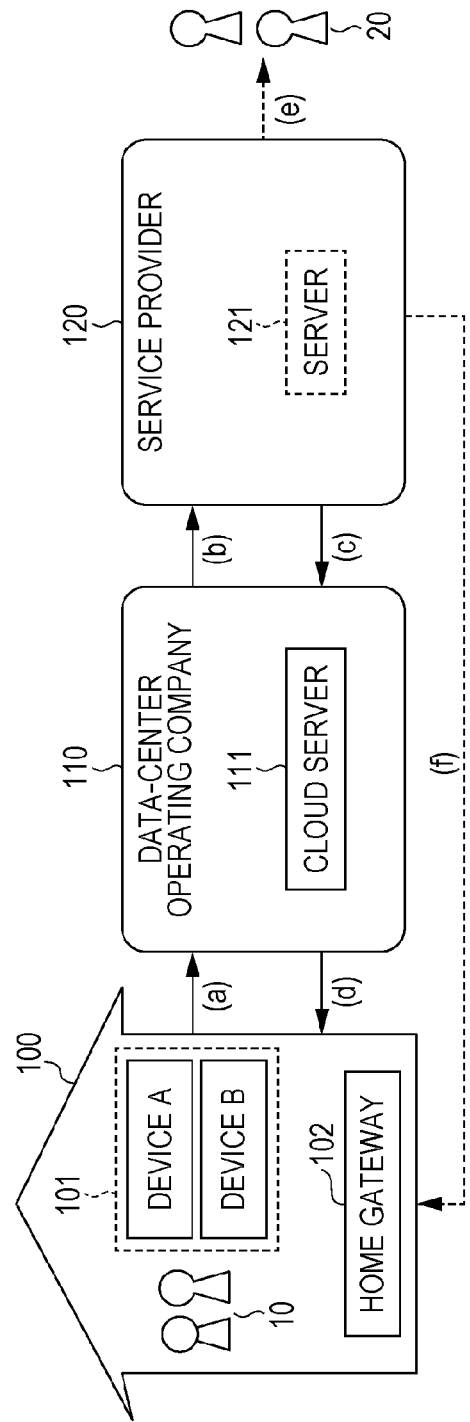
FIG. 1A is a diagram illustrating one example of an overall picture of a service provided in a configuration method for a sound collection system according to the present disclosure.

First, items that the present inventors have studied in order to disclose aspects according to the present disclosure. (Knowledge Underlying Present Disclosure)

In the remote meeting system disclosed in Non-Patent Document 1, smartphones are connected to a communications terminal that performs communication with a remote place through a network and collect speech by using microphones of the smartphones. This makes it possible to collect speech of a large number of participants, compared with a case in which standalone microphones are used.

However, although connecting general smartphones to the communications terminal involves various procedures for the connection, a method therefor is not disclosed in Non-Patent Document 1.

Also, the communications terminal used in Non-Patent Document 1 is a dedicated communications terminal for a remote meeting, and there is no disclosure about a method for holding a remote meeting by using only smartphones in a typical meeting room where such a dedicated device is not prepared.

In addition, when terminals, such as smartphones, are brought close and made to operate in cooperation with each other, it is necessary to perform authentication and connection processing between the terminals (this processing is hereinafter referred to as "pairing"). The pairing generally uses a method using radio waves through a wireless (local area network) LAN or a Bluetooth (registered trademark) link. However, it is risky to use pairing over radio waves to perform a terminal connection for aiding a meeting. This is because the pairing may allow a malicious user who is not participating in the meeting to secretly connect his or her terminal to wiretap details of the meeting. For pairing, such wiretapping can be prevented by requiring password authentication or the like. In such a case, however, normal participants in a meeting also have to set passwords each time they participate in the meeting, thus causing a problem in convenience.

In view of the foregoing problems, this configuration method for a sound collection system is directed to a method for collecting the sound of utterances in a meeting by utilizing microphones included in smartphones brought into a meeting room by participants in the meeting and is intended to easily and safely perform smartphone connection.

This configuration method for the sound collection system is intended to easily perform, in a system in which microphones of terminals are used to collect the sound of utterances of participants in, mainly, a meeting, checking participation in the meeting, connection and synchronization of each terminal, and setting of each terminal.

A configuration method for a sound collection system according to present disclosure is directed to a configuration method for a sound collection system for a meeting, the system obtaining speech from terminals. The method includes: receiving external sounds from the respective terminals as collected-sound data, the external sounds being collected by the respective terminals; and determining a meeting to which each of the terminals belongs, in accordance with a degree of similarity between the collected-sound data.

At least one of the receiving the collected-sound data and the determining the meeting is performed by a processor.

With this arrangement, by utilizing collected-sound data resulting from sound collection performed using terminals brought into a meeting room, it is possible to easily determine a meeting to which terminals that participate in the meeting belong, without having to install a special dedicated device in the meeting room.

Also, when a plurality of terminals belong to the same meeting, the degree of similarity between collected-sound data corresponding to external sounds collected by the respective terminals is high. Hence, by determining that terminals having a high degree of similarity belong to the same meeting, it is possible to easily determine a meeting to which each terminal belongs.

In the determining the meeting, first collected-sound data obtained by a first terminal of the terminals may be compared with second collected-sound data obtained by a second terminal of the terminals, and when a degree of similarity between the first collected-sound data and the second collected-sound data is larger than or equal to a threshold, it may be determined that a meeting to which the first terminal belongs and a meeting to which the second terminal belongs are the same.

This makes it possible to reduce false recognition during determination of a meeting to which each terminal belongs.

In the determining the meeting, when it is determined that the collected-sound data received in the receiving the collected-sound data include second collected-sound data obtained by a second terminal for which a meeting to which the second terminal belongs is not determined in the determining the meeting, the second collected-sound data may be compared with first collected-sound data obtained by a first terminal determined to already belong to a first meeting in the determining the meeting; and when a result of the comparison indicates that the degree of similarity between the second collected-sound data and the first collected-sound data is larger than or equal to a pre-set threshold, it may be determined that the second terminal belongs to the first meeting.

This makes it possible to reduce false recognition during determination of a meeting to which each terminal belongs.

The first collected-sound data obtained by the first terminal includes speech data obtained when a participant in the first meeting uttered in the first meeting.

When a user of the second terminal participates in the same meeting as the first meeting to which a user of the first terminal belongs, the collected-sound data resulting from the sound collection respectively performed by the first meeting and the second terminal include speech data obtained when a participant in the first meeting uttered. Thus, the degree of similarity (a first degree of similarity) when the first collected-sound data is compared with the second collected-sound data is high.

On the other hand, when the user of the second terminal does not participate in the same meeting as the first meeting to which the user of the first terminal belongs, the collected-sound data resulting from the sound collection performed by the first terminal includes speech data obtained when a participant in the first meeting uttered, but the collected-sound data resulting from the sound collection performed by the second terminal does not include speech data obtained when a participant in the first meeting uttered. Thus, the degree of similarity (a second degree of similarity) when the first collected-sound data is compared with the second collected-sound data is low.

Accordingly, when a value with which it is possible to distinguish between the first degree of similarity and the second degree of similarity (e.g., a value that is larger than the second degree of similarity and that is smaller than the first degree of similarity) is set for a threshold, it is possible to further reduce false recognition during determination of a meeting to which the second terminal belongs.

In the determining that meeting, the second collected-sound data may be compared with the first collected-sound data and other collected-sound data received in the receiving the collected-sound data, and when a result of the comparison indicates that collected-sound data whose degree of similarity is larger than or equal to the pre-set threshold does not exist, a second meeting may be set as a new meeting, and it may be determined that the second terminal belongs to the second meeting.

This makes it possible to comprehend and manage a plurality of meetings.

The method may further include performing speech recognition on the collected-sound data and creating minutes for each meeting.

This makes it possible to provide a minutes service that allows for checking of utterances whose sound was collected in a meeting, without using a special device.

The method may further include: transmitting first collected-sound data included in the collected-sound data and obtained by a first terminal to a second terminal determined to belong to a meeting different from a meeting to which the first terminal belongs; and causing the second terminal to output the first collected-sound data.

This makes it possible to provide a remote meeting service that holds a remote meeting between meeting rooms at a plurality of places.

The method may further include: generating meeting-determination sound signals that are different from one meeting to another; transmitting a first meeting-determination sound signal of the meeting-determination sound signals to a first terminal that belongs to a first meeting; causing the first terminal to output the first meeting-determination sound signal; and causing a second terminal to collect external sound when the first terminal outputs the first meeting-determination sound signal and receiving collected-sound data resulting from the sound collection performed by the second terminal. In the determining the meeting, a meeting to which the second terminal belongs may be determined in accordance with a degree of similarity between the first meeting-determination sound signal and the collected-sound data received from the second terminal.

In a case in which the user of the second terminal participates in the same meeting as the first meeting to which the user of the first terminal belongs, when the second terminal collects external sound when the first terminal outputs the first meeting-determination sound signal, the collected-sound data resulting from the sound collection performed by the second terminal includes an output of the first meeting-determination sound signal, the output being performed by the first terminal.

Hence, the degree of similarity (a first degree of similarity) between the first meeting-determination sound signal and the collected-sound data resulting from the sound collection performed by the second terminal is high.

On the other hand, in a case in which the user of the second terminal does not participate in the same meeting as the first meeting to which the user of the first terminal belongs, when the second terminal collects external sound when the first terminal outputs the first meeting-determination sound signal, the collected-sound data resulting from the sound collection performed by the second terminal does not include an output of the first meeting-determination sound signal, the output being performed by the first terminal.

Hence, the degree of similarity (a second degree of similarity) between the first meeting-determination sound signal and the collected-sound data resulting from the sound collection performed by the second terminal is low. Accordingly, when a value with which it is possible to distinguish between the first degree of similarity and the second degree of similarity (e.g., a value that is larger than the second degree of similarity and that is smaller than the first degree of similarity) is set for a threshold, it is possible to further reduce false recognition during determination of a meeting to which the second terminal belongs.

Thus, by utilizing the degree of similarity between the first meeting-determination sound signal and the collected-sound data received from the second terminal, the determination of the meeting to which the second terminal belongs can be performed with higher accuracy.

The method may further include: generating meeting-checking sound signals that are different from one meeting to another; transmitting, to the second terminal, a first meeting-checking sound signal included in the meeting-checking sound signals and allocated to the first meeting; causing the second terminal to output the first meeting-checking sound signal; causing the first terminal to collect the external sound when the second terminal outputs the first meeting-checking sound signal and receiving collected-sound data resulting from the sound collection performed by the first terminal; and checking whether or not that the meeting determined to be a meeting to which the second terminal belongs in the determining the meeting is correct, in accordance with a degree of similarity between the first meeting-checking sound signal and the collected-sound data received from the first terminal.

If the determination of the meeting to which the second terminal belongs is correct, the collected-sound data resulting from the sound collection performed by the first terminal includes an output of the first meeting-checking sound signal, the output being performed by the second terminal, since the first terminal that belongs to the same meeting as the meeting to which the second terminal belongs collects external sound when the second terminal outputs the first meeting-checking sound signal. Hence, it is possible to check whether or not the determination of the meeting to which the second terminal belongs is correct.

Thus, the determination of the meeting to which the second terminal belongs can be performed with higher accuracy. It is also possible to prevent wiretapping of a meeting from space near a meeting room.

The method may further include: generating list information indicating a state of one or more terminals belonging to the meeting determined in the determining the meeting and transmitting the list information to any of the one or more terminals belonging to the meeting; and causing the terminal that is included in the one or more terminals belonging to the meeting and that receives the list information to display the list information.

With this arrangement, since each user can check participants who participate in the same meeting, it is possible to indicate and correct system false recognition regarding terminals of participants who participate in the meeting. It is also possible to prevent wiretapping of a meeting from space near a meeting room.

A server apparatus according to the present disclosure is directed to a server apparatus used for a sound collection system for a meeting, the system obtaining speech from terminals. The server apparatus includes: a receiver that receives external sounds from the terminals as collected-sound data, the external sounds being collected by the respective terminals; and a meeting determiner that determines a meeting to which each of the terminals belongs, in accordance with a degree of similarity between the collected-sound data. At least one of the receiver and the meeting determiner has a processor.

With this arrangement, by utilizing collected-sound data resulting from sound collection performed using terminals brought into a meeting room, it is possible to easily determine a meeting to which terminals that participate in the meeting belong, without having to install a special dedicated device in the meeting room.

Also, when a plurality of terminals belong to the same meeting, the degree of similarity between collected-sound data corresponding to external sounds collected by the respective terminals is high. Hence, by determining that terminals having a high degree of similarity belong to the same meeting, it is possible to easily determine a meeting to which each terminal belongs.

As described above, in the configuration method for the sound collection system for a meeting using a plurality of terminals, a plurality of terminals, such as smartphones, brought into a meeting by participants in a meeting are connected to a server on a network, and speech data resulting from sound collection utilizing the microphones of the smartphones as microphones for the meeting are transmitted to the server. For example, the server combines the speech data into a piece of speech data and transfers the speech data to the place of another meeting to allow a remote meeting and performs speech recognition on the speech data to allow automatic creation of minutes. In this case, the degree of similarity between the speech data transmitted from the smartphones is used in order to determine to which meeting the smartphone brought by each participant belongs.

Each smartphone that participates in a meeting and that is connected to the server collects the sound of speech in the meeting room and transmits the collected sound to the server as speech data. Smartphones that are in the same meeting room collect the same speech made in the meeting room, although a certain difference in the sound level occurs depending on the positions where the smartphones are placed. Accordingly, the server determines the degree of similarity of the collected speech and recognizes, as smartphones placed in the same meeting room, smartphones having a degree of similarity higher than or equal to a certain threshold. The server provides a meeting-aid service to the smartphones. Examples of the service includes holding a remote meeting by combining speech data resulting from sound collection and transferring the combined speech data to another place to hold a remote meeting, transmitting minutes resulting from speech recognition, and so on.

In the configuration method for the sound collection system according to the present disclosure, pairing for making smartphones used for a meeting operate in cooperation with each other is performed using the degree of similarity of speech whose sound was collected, rather than using radio waves. Thus, since a smartphone for wiretapping which is placed at the opposite side of the wall of a meeting room has a low degree of similarity in speech, it is possible to reject the smartphone participating in the meeting. In addition, since the degree of similarity in speech is determined, password input required for highly secure pairing using radio waves is not necessary. Thus, it is possible to easily make the smartphones operate in cooperation with each other.

Embodiments described below represent specific examples of the configuration method for the sound collection system. Numerical values, shapes, constituent elements, steps, the order of steps, and so on described in the embodiments below are merely examples and are not intended to limit the configuration method for the sound collection system. Of the constituent elements in the embodiments described below, components not set forth in the independent claims that represent the broadest concept will be described as optional components. In all of the embodiments, what are disclosed therein may also be combined together.

(Overall Picture of Service to be Provided)

FIG. 1A illustrates an overall picture of an information providing system in the present embodiment.

A group 100 is, for example, a company, an entity, or a room in a home, and the scale thereof is not limited. For example, a building owned by a company or entity corresponding to the group 100 or a home corresponding thereto has a room (a meeting room). The room has a plurality of devices 101, including devices A and B, and a home gateway 102. Examples of the devices A and B include music players, game consoles, and smartphones having microphones. The plurality of devices 101 include devices (e.g., smartphones) that can connect to the Internet and devices (e.g., game consoles) that cannot connect to the Internet on their own. The plurality of devices 101 may include a device that can connect to the Internet via the home gateway 102 even if it is not capable of connecting to the Internet on its own. The group 100 includes users 10 who use the plurality of devices 101.

Figure 1B:
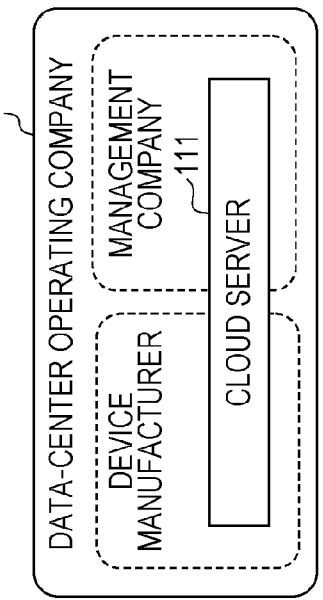
FIG. 1B is a diagram illustrating one example of a relationship between a data-center operating company and a device manufacturer in the sound collection system according to the present disclosure.
Figure 1C:
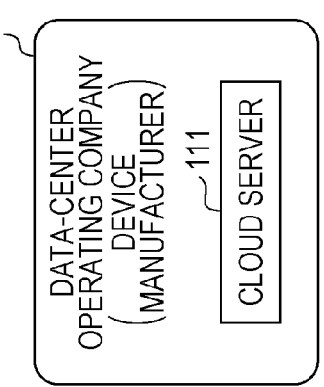
FIG. 1C is a diagram illustrating one example of a relationship of a data-center operating company, a device manufacturer, and a management company in the sound collection system according to the present disclosure.

A data-center operating company 110 has a cloud server 111. The cloud server 111 is a virtualization server that cooperates with various types of device through the Internet. The cloud server 111 mainly manages, for example, big data that is difficult to process with a typical database-management tool or the like. The data-center operating company 110 performs data management, management of the cloud server 111, operations of a data center that performs the management, and so on. Details of a service provided by the data-center operating company 110 are described later. In this case, the data-center operating company 110 is not limited to a company that performs only data management, operations of the cloud server 111, or the like. For example, when a device manufacturer that develops and manufactures one of the devices 101 also performs data management, management of the cloud server 111, and so on, this device manufacturer corresponds to the data-center operating company 110 (FIG. 1B). The data-center operating company 110 is not limited to a single company. For example, when the device manufacturer and another management company perform data management and operation of the cloud server 111 in cooperation with each other or in a shared manner, one of or both the device manufacturer and the other management company is/are assumed to correspond to the data-center operating company 110 (FIG. 1C).

A service provider 120 has a server 121. The size of the server 121 as used herein is not limited, and examples of the server 121 include a memory in a personal PC or the like. The service provider 120 may or may not have the server 121.

In the service described above, the home gateway 102 is not essential. For example, when the cloud server 111 performs all data management, the home gateway 102 may be eliminated. There are also cases in which the devices 101 do not include any device that is incapable of connecting to the Internet on their own, as in a case in which all devices in a home are connected to the Internet.

Next, a description will be given of a flow of information in the above-described service.

First, the device A or B in the group 100 transmits log information to the cloud server 111 in the data center 110. The cloud server 111 aggregates log information, such as collected-sound data (or referred to as "sound signals") resulting from sound collection using a microphone of the equipment A or B ((a) in FIG. 1A). The "log information" as used herein includes, for example, not only speech data (which is also referred to as "speech signals") included in the collected-sound data (sound signals), but also information regarding operations of the devices 110 by the users 10, information input through operations of the devices 110 by the users 10, or the like, the information being obtained by the devices 101. For example, when each user 10 uses his or her smartphone as a microphone in a meeting, information of the location where the smartphone is placed (the information is obtained using a GPS or a MAC address of a wireless LAN station) may be aggregated as the log information. When the user 10 gives permission, operation history of the smartphone of the user 10, a picture taken by the user 10, personal information of the user 10, or the like may also be used as the log information. The log information may also be directly supplied from the devices 101 to the cloud server 111 through the Internet. The log information from the devices 101 may also be temporarily aggregated in the home gateway 102 and be supplied from the home gateway 102 to the cloud server 111.

Next, the cloud server 111 in the data-center operating company 110 supplies the aggregated log information to the service provider 120 in a certain unit of information. The certain unit of information may be a unit with which the data-center operating company 110 can organize the aggregated information and can supply it to the service provider 120 or may be a unit requested by the service provider 120. Although the unit of information has been described above as being a certain unit of information, it does not necessarily have to be a certain unit of information, and there are also cases in which the amount of information to be supplied changes depending on the situation. The log information is stored in the server 121 of the service provider 120, as appropriate ((b) in FIG. 1A). The service provider 120 then organizes the log information into information that suits a service to be provided to users, and provides the service to the users. The users to which the service is provided may be the users 10 of the devices 101 or may be outside users 20. A method for providing the service to the users may be, for example, a method in which the service is directly supplied from the service provider to the users ((e) and (f) in FIG. 1A). For example, the method for supplying the service to the users may be, for example, a method in which the service is supplied to the users after going through the cloud server 111 in the data-center operating company 110 again ((c) and (d) in FIG. 1A). The cloud server 111 in the data-center operating company 110 may also organize the log information into information that suits the service to be provided to the users, and may provide the service to the service provider 120.

The users 10 and the users 20 may be the same or may be different from each other.

Embodiments of a configuration method for a sound collection system will be described with reference to the accompanying drawings.

First Embodiment

Figure 6:
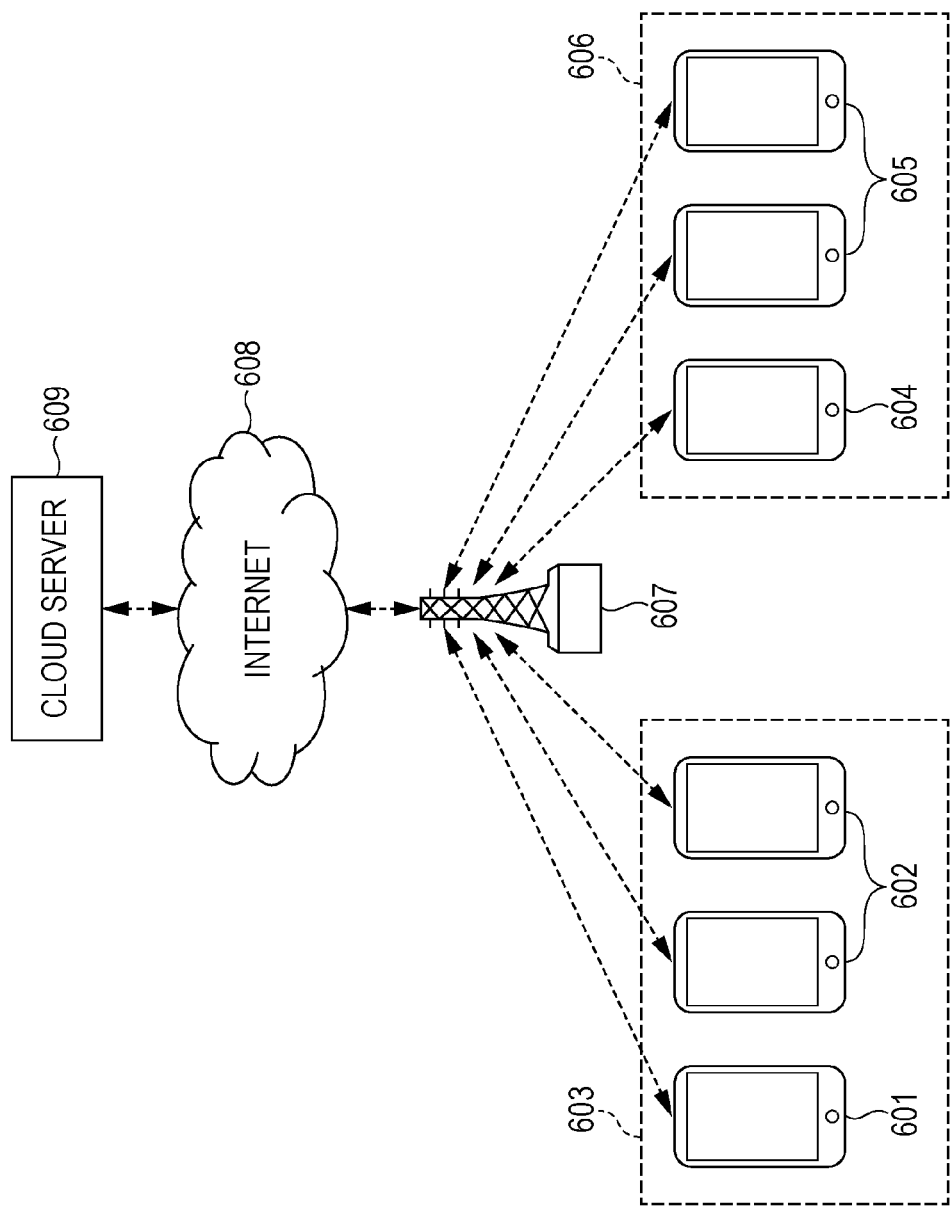
FIG. 6 is a diagram illustrating one example of the sound collection system according to the present disclosure.

FIG. 6 is a diagram (a first block diagram) illustrating one example of the configuration of a sound collection system for a meeting using a plurality of terminals according to a first embodiment of a configuration method for a sound collection system.

In FIG. 6, a representative terminal 601 is a smartphone or the like that is brought into a meeting room 603 by a participant therein. Participating terminals 602 are present in the same meeting room 603 where the representative terminal 601 is present and is in the possession of participants who participate in the same meeting as that of the participant who brought the representative terminal 601. The number of participating terminals 602 may be one or more.

Unlike the participating terminals 602, the representative terminal 601 performs setting for a cloud server 609 in order to receive a meeting-aid service provided by the cloud server 609. For example, the representative terminal 601 specifies a meeting room 606 at another place in order to hold a remote meeting. Except for performing such setting, there is substantially no difference between the representative terminal 601 and the participating terminals 602. Of the terminals that participate in the meeting in the meeting room 603, the representative terminal 601 may be a terminal that connects to the cloud server 609 the earliest or may be explicitly specified by a user.

By launching a meeting aid application, the terminals that participate in the meeting (e.g., the representative terminal 601 and the participating terminals 602) connect to the cloud server 609. It is assumed that the meeting aid application is provided by a service provider 120 and each terminal downloads and installs the application before the meeting. When the application is launched, it connects to the cloud server 609 indicated by a preset Uniform Resource Locator (URL) to transfer speech data collected by a microphone of the corresponding terminal to the cloud server 609.

In the meeting room 606, which is a room different from the meeting room 603, a representative terminal 604 and participating terminals 605 are present, as in the case of the meeting room 603.

A base station 607 performs mobile-phone wireless communication with terminals that are participating in the meeting. The base station 607 is connected with an Internet 608 through a cable, and the cloud server 609 is connected with the Internet 608. That is, the base station 607 and the Internet 608 are connected in a wireless or wired manner so as to allow terminals participating in the meetings and the cloud server 609 to communicate with each other.

The cloud server 609 accumulates information obtained through the Internet 608 and performs various types of processing on the basis of the obtained information. Details of the processing performed by the cloud server 609 are described later. The cloud server 609 may be managed by the data-center operating company 110 illustrated in FIG. 1A, 1B, or 1C or may be managed by the service provider 120.

Figure 7:
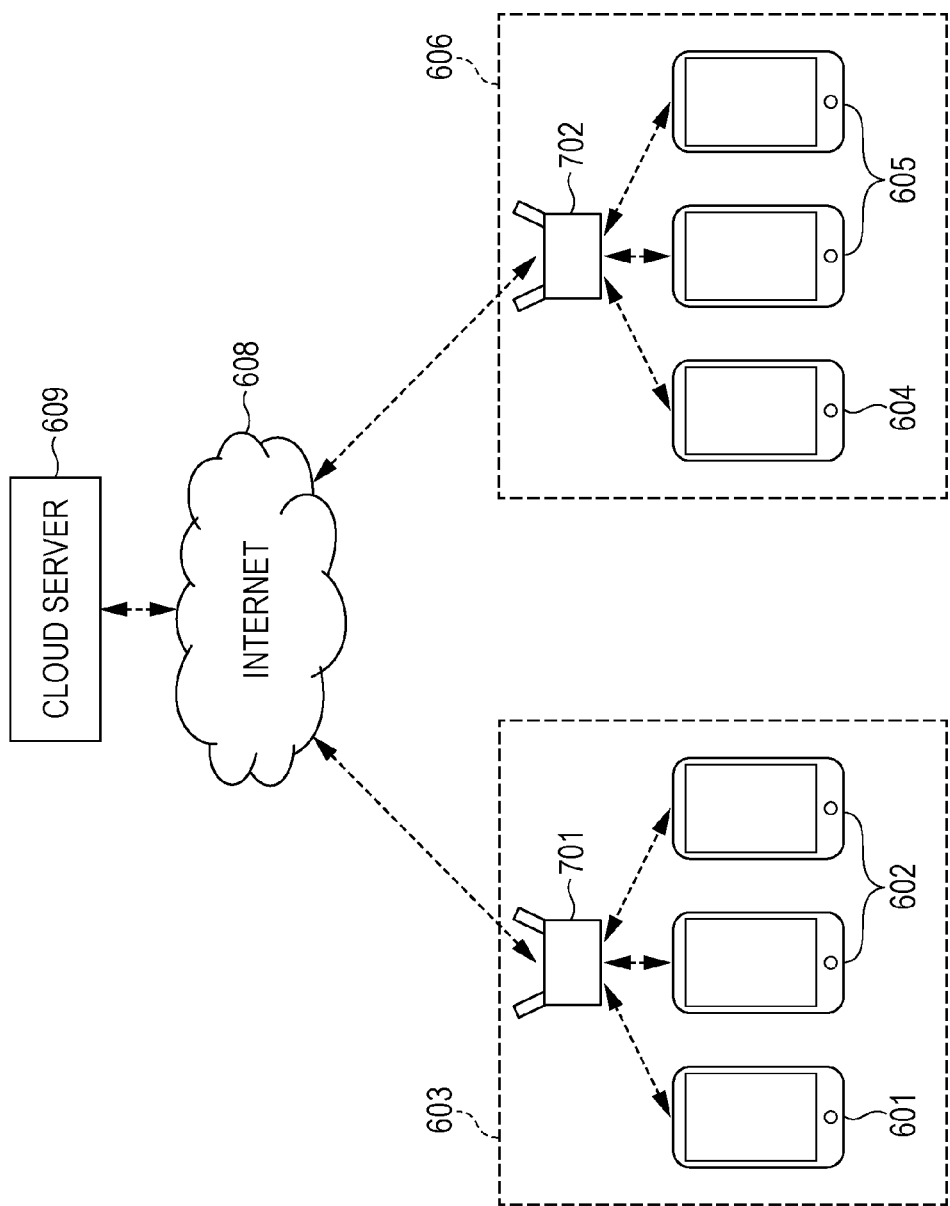
FIG. 7 is a diagram illustrating one example of the sound collection system according to the present disclosure.

The topology in which the terminals and the cloud server 609 are connected to each other is not limited to the topology illustrated in FIG. 6. FIG. 7 is a diagram (a second block diagram) illustrating one example of another configuration of the sound collection system according to the first embodiment. In FIG. 7, terminals that participate in meetings are connected to corresponding wireless LAN stations 701 and 702 through wireless LANs. The wireless LAN stations 701 and 702 are connected to the Internet 608. Other configurations are substantially the same as those in FIG. 6. That is, the topology in FIG. 6 and the topology in FIG. 7 differ from each other in whether the terminals connect to the cloud server 609 through mobile-phone wireless communication or wireless LANs. Another method may also be used to connect the terminals possessed by the participants participating in the meetings to the cloud server 609.

Figure 8:
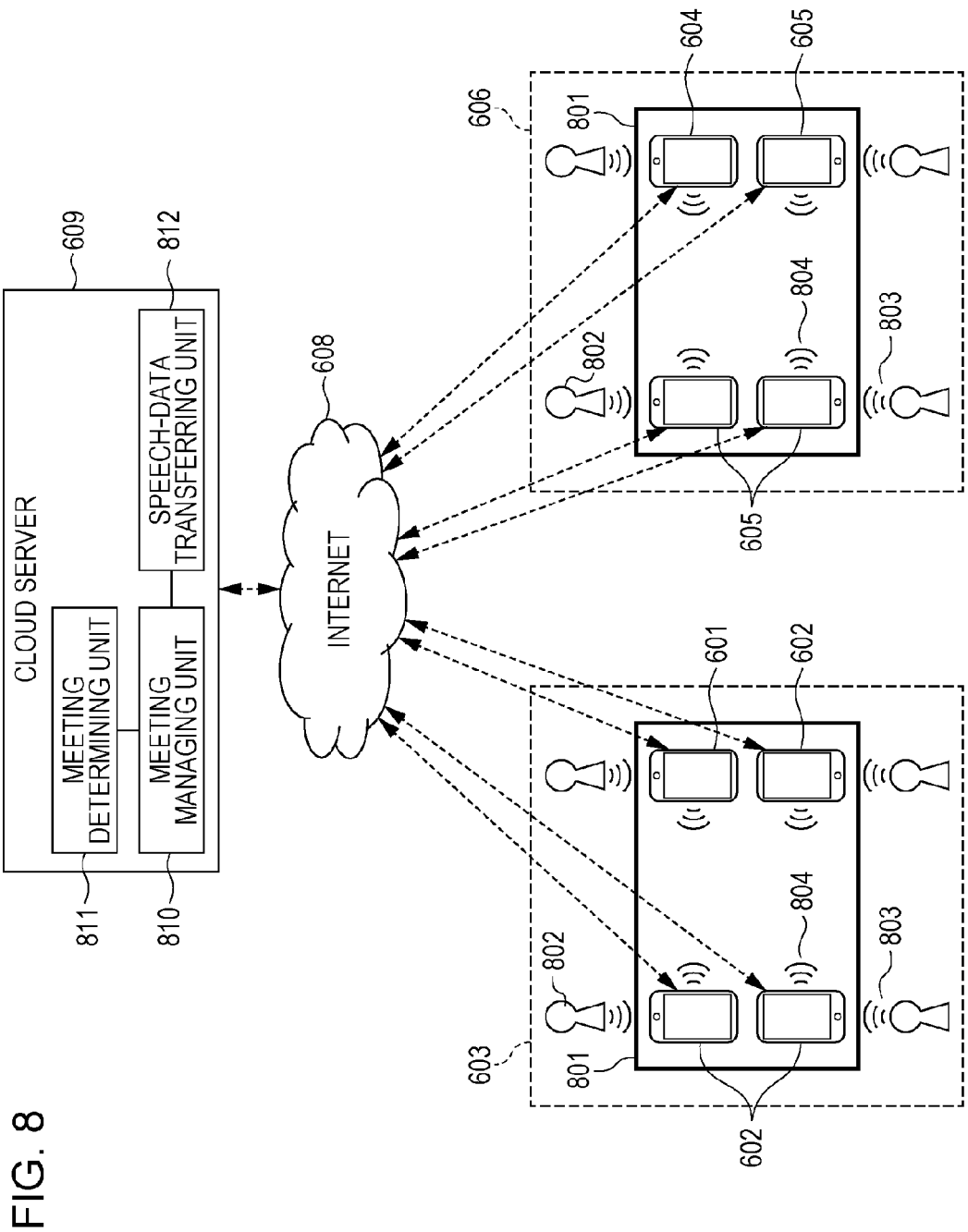
FIG. 8 is a diagram illustrating a first meeting-aid service in the configuration method for the sound collection system according to the present disclosure.

FIG. 8 illustrates a first meeting-aid service that is received by terminals connected to the cloud server 609 in the topology illustrated in FIG. 6 or 7. The meeting-aid service illustrated in FIG. 8 is a remote meeting. The representative terminal 601 pre-specifies, for the cloud server 609, the places (the meeting room 603 and the meeting room 606) where the remote meetings are held. For example, a representative terminal 601 and participating terminals 602 are placed on a table 801 in the meeting room 603.

For example, an owner of the representative terminal 601 (a participant in the meeting) is seated near the position where the representative terminal 601 is placed. Also, for example, owners of the participating terminals 602 (participants in the meeting) are seated near the positions where the participating terminals 602 are placed.

For example, a representative terminal 604 and participating terminals 605 are placed on the table 801 in a meeting room 606.

For example, an owner of the representative terminal 604 (a participant in the meeting) is seated near the position where the representative terminal 604 is placed. For example, owners of the participating terminals 605 (participants in the meeting) are seated near the positions where the participating terminals 605 are placed.

For example, each of the representative terminal 601 and the participating terminals 602 collects external sound. The sound collection is performed using microphones (not illustrated) included in the representative terminal 601 and the participating terminals 602.

For example, each of the representative terminal 604 and the participating terminals 605 collects external sound. The sound collection is performed using microphones (not illustrated) included in the representative terminal 604 and the participating terminals 605.

Each of the representative terminal 601 and the participating terminals 602 collects external sound and transmits the collected-sound data (or a sound signal) to the cloud server 609 through the Internet 608.

For example, when utterances 803 are made by a participant 802 in the meeting room 603, the collected-sound data resulting from the external sound collection performed by each of the representative terminal 601 and the participating terminals 602 includes speech data (or a speech signal) corresponding to the utterances 803 of the participant 802.

In the present embodiment, a description is given below assuming that collected-sound data resulting from external sound collection performed by a terminal (e.g., the representative terminal 601 or 604 or the participating terminal 602 or 604) brought into the meeting room by the participant who participates in the meeting room is speech data, unless otherwise particularly stated.

Each of the representative terminal 601 and the participating terminals 602 collects the sound of the utterances 803 of the participant 802 and transfers the collected sound to the cloud server 609 through the Internet 608 as speech data.

On the other hand, in the meeting room 606 at another place, a terminal (the representative terminal 604 or each participating terminal 605) is placed on a table 801 in the meeting room 606 to collect the sound of the utterances 803 and to transmit the collected sound to the cloud server 609 as speech data.

FIG. 8 is a diagram illustrating a first meeting-aid service in the sound collection system in the present embodiment.

When the first meeting-aid service illustrated in FIG. 8 is provided, the cloud server 609 includes a meeting managing unit 810, a meeting determining unit 811, and a speech-data transferring unit 812. The cloud server 609 may also include an element other than the meeting managing unit 810, the meeting determining unit 811, and the speech-data transferring unit 812.

The meeting managing unit 810 manages to which meeting a terminal that is connected to the cloud server 609 to transmit speech data belongs. In accordance with an instruction from the meeting managing unit 810, the speech-data transferring unit 812 transfers utterances 803 made in the meeting room 603 to the meeting room 606 and transfers the utterances 803 made in the meeting room 606 to the meeting room 603.

The transferred speech data is output from the terminals at each place (or each meeting room) (output 804). This makes it possible to hold a remote meeting.

When a new terminal is connected to the cloud server 609, the meeting determining unit 811 determines to which meeting room the terminal belongs. The operation of the meeting determining unit 811 is an essence of the configuration method for the sound collection system and is described below in detail.

Figure 9:
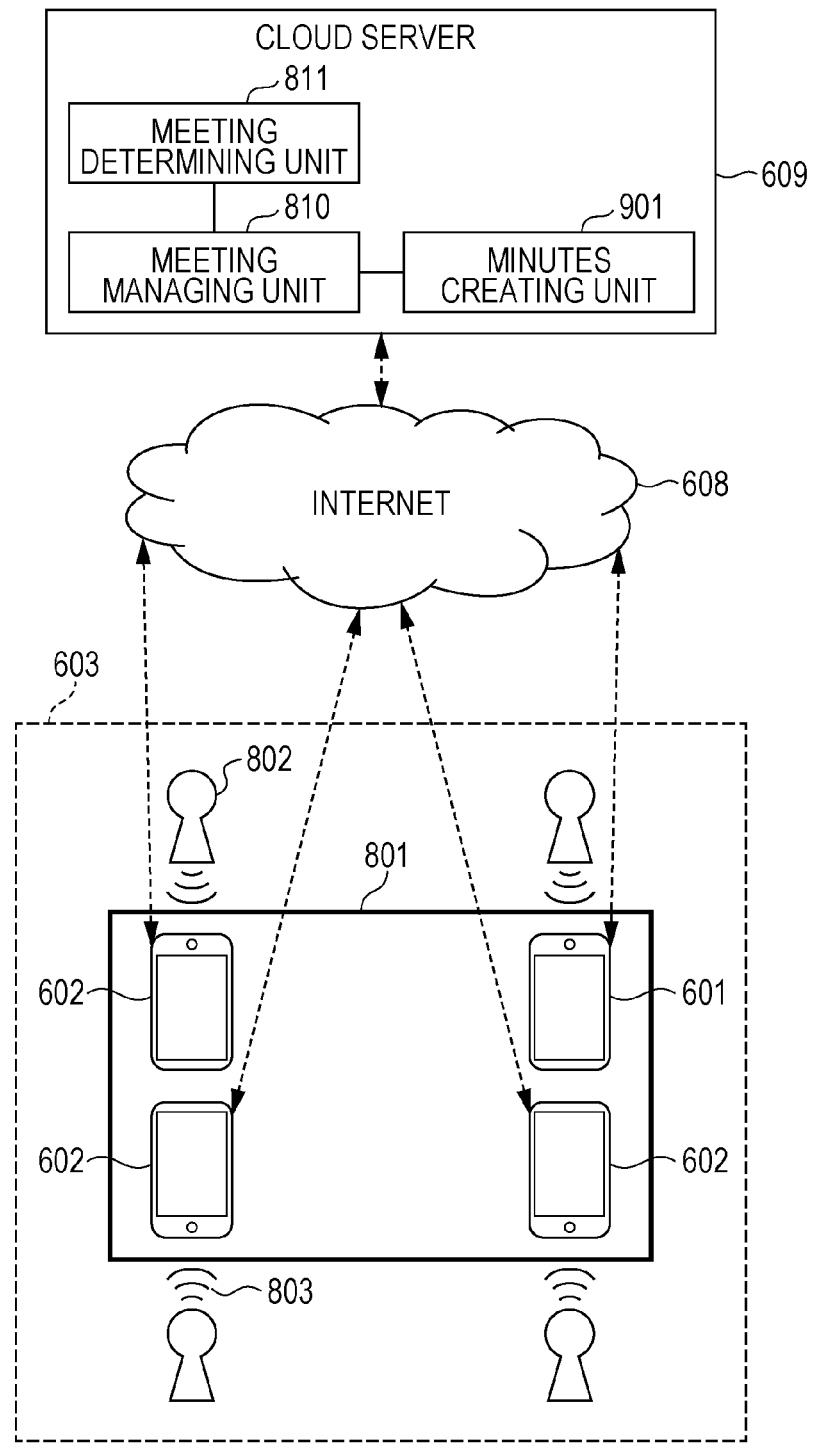
FIG. 9 is a diagram illustrating a second meeting-aid service in the configuration method for the sound collection system according to the present disclosure.

FIG. 9 illustrates a second meeting-aid service that is received by the terminals connected to the cloud server 609 in the topology illustrated in FIG. 6 or 7. FIG. 9 is a diagram illustrating the second meeting-aid service in the sound collection system in the present embodiment. The second meeting-aid service illustrated in FIG. 9 is a minutes creation system.

When the second meeting-aid service illustrated in FIG. 9 is provided, the cloud server 609 includes a meeting managing unit 810, a meeting determining unit 811, and a minutes creating unit 901. The cloud server 609 may also include another element other than the meeting managing unit 810, the meeting determining unit 811, and the minutes creating unit 901.

As in FIG. 8, a representative terminal 601 and participating terminals 602 are placed on a table 801 in a meeting room 603, and the sound of utterances 803 of a participant 802 are collected by each terminal and is transferred to the cloud server 609 through the Internet 608 as speech data.

The meeting managing unit 810 manages to which meeting a terminal that is connected to the cloud server 609 to transmit speech data belongs. The meeting managing unit 810 combines speech data from the same meeting room 603, and the minutes creating unit 901 performs speech recognition on the speech data to create minutes for the meeting room 603. In addition, the meeting managing unit 810 transfers the created minutes to the terminals that are participating in the meeting room 603. The "speech recognition" as used herein includes a series of processes for extracting speech data resulting from utterances made by people from collected-sound data and converting the speech data into a character string. Based on the converted character string, the minutes are created. The "extraction of speech data" refers to eliminating ambient sound (noise) other than speech uttered by people.

For example, a bandpass filter (not illustrated) that permits passage of data in a frequency band included in human speech may be used to extract speech data from the collected-sound data.

Figures 10, 11:
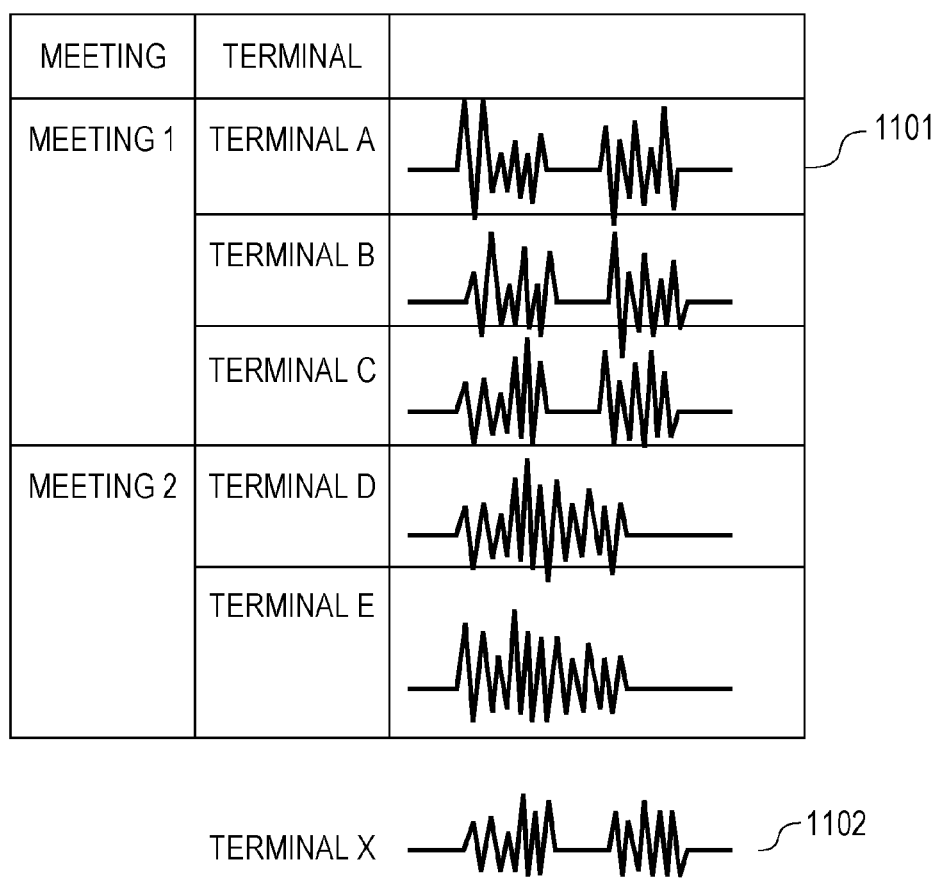
FIG. 10 illustrates one example of a meeting table included in a meeting managing unit in a first embodiment of the configuration method for the sound collection system according to the present disclosure.
FIG. 11 illustrates one example of speech data received from terminals registered in the meeting table in the first embodiment.

In the cloud servers 609 in both of the first and second meeting-aid services, the meeting managing unit 810 and the meeting determining unit 811 are provided. FIG. 10 illustrates information that is managed by the meeting managing unit 810. The meeting managing unit 810 manages a meeting table 1001. The meeting table 1001 is stored in a memory (not illustrated) included in the cloud server 609. Examples of information recorded in the meeting table 1001 include information about meetings that are held utilizing the meeting-aid service and information about terminals used by participants who participate in the corresponding meetings.

The information about the terminals, the information being recorded in the meeting table 1001, is identified with unique IDs of the respective terminals. One possible example of the information is a MAC address given to each terminal and is confirmed to be unique.

The information about the terminals may also include, for example, information indicating whether or not the terminal of interest is a representative terminal or a participating terminal.

An operation when a new terminal X is connected to the cloud server 609 in this case will now be described with reference to FIGS. 17A and 17B.

Figure 17A:
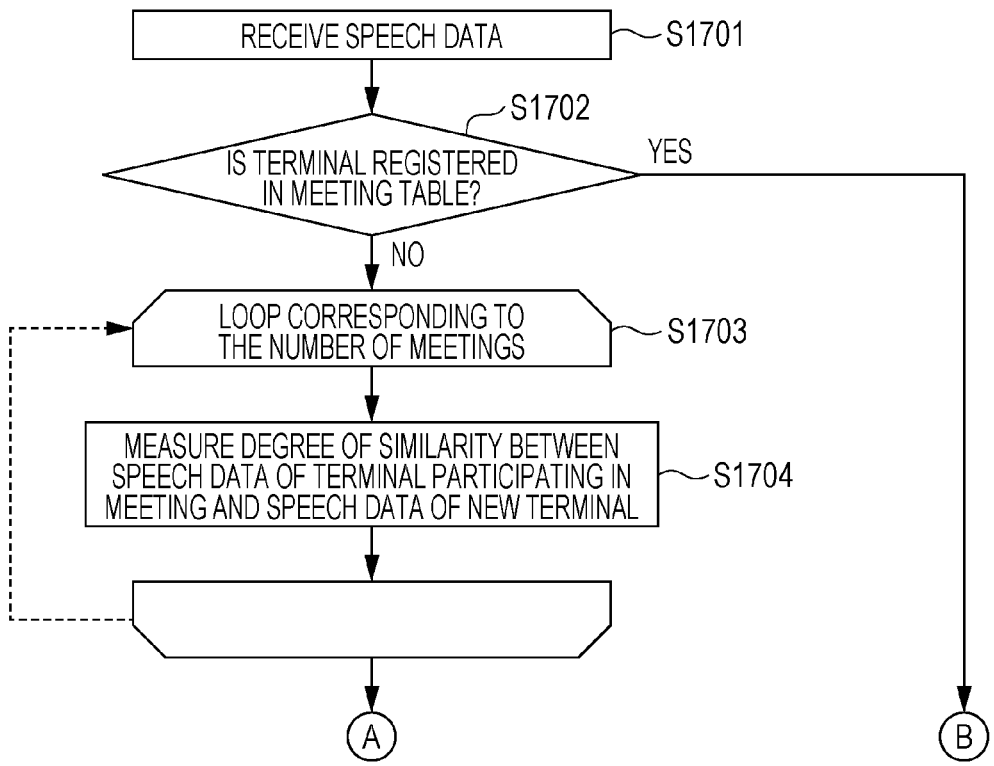
FIG. 17A is a flowchart illustrating one example of an operation when a new terminal is connected to a cloud server in the first embodiment.

FIG. 17A is flowchart illustrating one example of an operation when the new terminal X is connected to the cloud server 609. FIG. 17B is a flowchart illustrating one example of an operation when the new terminal X is connected to the cloud server 609.

It is assumed that the new terminal X has completed connection to the cloud server 609 and, for example, with which meeting of the recorded meetings the terminal X is to be associated and be registered in the meeting table 1001 illustrated in FIG. 10 has not been determined.

The cloud server 609 receives speech data transmitted from a connected terminal (S1701). The cloud server 609 then checks whether or not the terminal that transmitted the received speech data is registered in the meeting table 1001 (S1702). If the terminal is registered, a process in step S1708 illustrated in FIG. 17B is performed. If the terminal is not registered (NO in step S1702), a loop is performed a number of times corresponding to the number of meetings registered in the meeting table 1001 (S1703). When the process in steps S1703 is finished, a process in step S1705 illustrated in FIG. 17B is performed. In the loop, a degree of similarity between speech data transmitted by each terminal used by a participant who participates in the meeting selected in the loop (a first terminal; e.g., a representative terminal or participating terminal corresponding to a selected meeting) and speech data transmitted by the newly connected terminal X (a second terminal) is measured (S1704). If the degree of similarity is measured for every meeting, a determination is made as to whether or not the value of a highest degree of similarity is larger than or equal to a pre-defined threshold (S1705).

If the value is larger than or equal to the threshold, it can be thought that the participant who uses the terminal X is newly participating in the meeting in which the participant who uses the first terminal that transmitted the speech data with which the degree of similarity is the largest. That is, it can be thought the terminal X is placed in the same meeting room as the meeting room to which the first terminal belongs. Hence, it is determined that the second terminal (the terminal X) belongs to the same meeting as the meeting to which the first terminal that transmitted the speech data with which the degree of similarity is the largest belongs.

In this case, in the meeting table 1001, the terminal X is registered for the same meeting as the meeting to which the first terminal that transmitted the speech data with which the degree of similarity is the largest belongs (S1706).

If the value is smaller than the threshold, this means that there is no terminal that has collected speech data that is sufficiently similar to the speech data resulting from the sound collection performed by the terminal X. Thus, it is determined that the participant who possesses the terminal X is participating in a new meeting that is not registered with the cloud server 609 (more specifically, in the meeting table 1001).

In this case, the new meeting is entered in the meeting table 1001, the terminal X is registered as a representative terminal or a participating terminal in the meeting, and a corresponding buffer memory (or buffer) is allocated to the terminal X (S1707). Since the meeting to which the terminal X belongs has been determined, the data received from the terminal X is stored in the buffer for the terminal X (S1708).

For example, suppose a case in which the user of the second terminal newly participates in one (a first meeting) of the meetings registered in the meeting table 1001. In this case, each of the collected-sound data resulting from sound collection performed by the second terminal that has newly participated and the collected-sound data resulting from sound collection performed by the terminal that belongs to the first meeting (or the terminal placed in the meeting room for the first meeting) includes speech data obtained when participants in the first meeting uttered.

Hence, it can be thought that the degree of similarity (a first degree of similarity) when the collected-sound data (first collected-sound data) resulting from the sound collection performed by the terminal that belongs to the first meeting is compared with the collected-sound data (second collected-sound data) resulting from the sound collection performed by the second terminal is high.

The collected-sound data resulting from sound collection performed by a terminal that belongs to a meeting (a second meeting) that is included in the meetings registered in the meeting table 1001 and that is different from the first meeting does not include speech data obtained when the participants in the first meeting uttered.

Even if speech uttered by the participants in the first meeting is included in the collected-sound data resulting from the sound collection performed by the terminal that belongs to the second meeting, it can be thought that the signal level of the speech is low, compared with that of speech obtained by the terminal that belongs to the first meeting.

This is because the first meeting and the second meeting are held, for example, in different meeting rooms (or different spaces).

Hence, it can be thought that the degree of similarity (the second degree of similarity) when the collected-sound data (the first collected-sound data) resulting from the sound collection performed by the terminal that belongs to a meeting other than the first meeting is compared with the collected-sound data (the second collected-sound data) resulting from the sound collection performed by the second terminal is low.

Hence, when the threshold in step S1705 is set to a value that is larger than the second degree of similarity and that is smaller than the first degree of similarity, it is possible to determine to which meeting the terminal X that has newly participated belongs (or in which meeting room the terminal X is placed) or it is possible to determine whether or not the meeting is a new unregistered meeting.

Figure 17B:
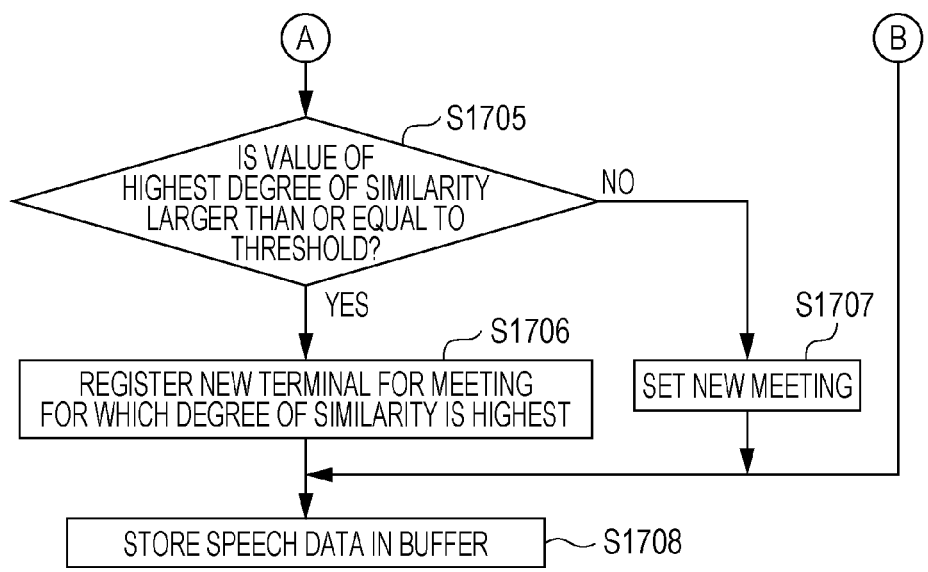
FIG. 17B is a flowchart illustrating one example of an operation when a new terminal is connected to the cloud server in the first embodiment.

Since the above-described processing is performed using speech data that is included in collected-sound data and that corresponds to utterances of a participant in a meeting, for example, the flowcharts in FIGS. 17A and 17B may be executed after the speech data is extracted from the collected-sound data.

For example, the cloud server 609 may extract speech data included in collected-sound data.

Alternatively, after speech data included in collected-sound data resulting from sound collection respectively performed by the representative terminal 601 and the participating terminals 602 are extracted, the speech data may be transmitted to the cloud server 609.

Figure 18A:
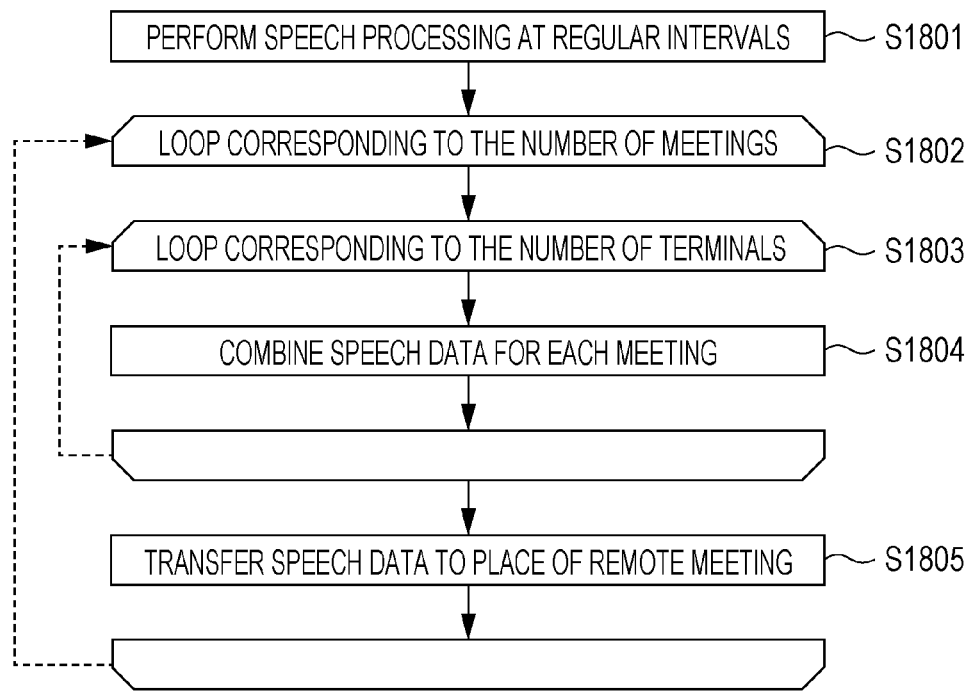
FIG. 18A is a flowchart illustrating one example of processing for a remote meeting in the first embodiment.
Figure 18B:
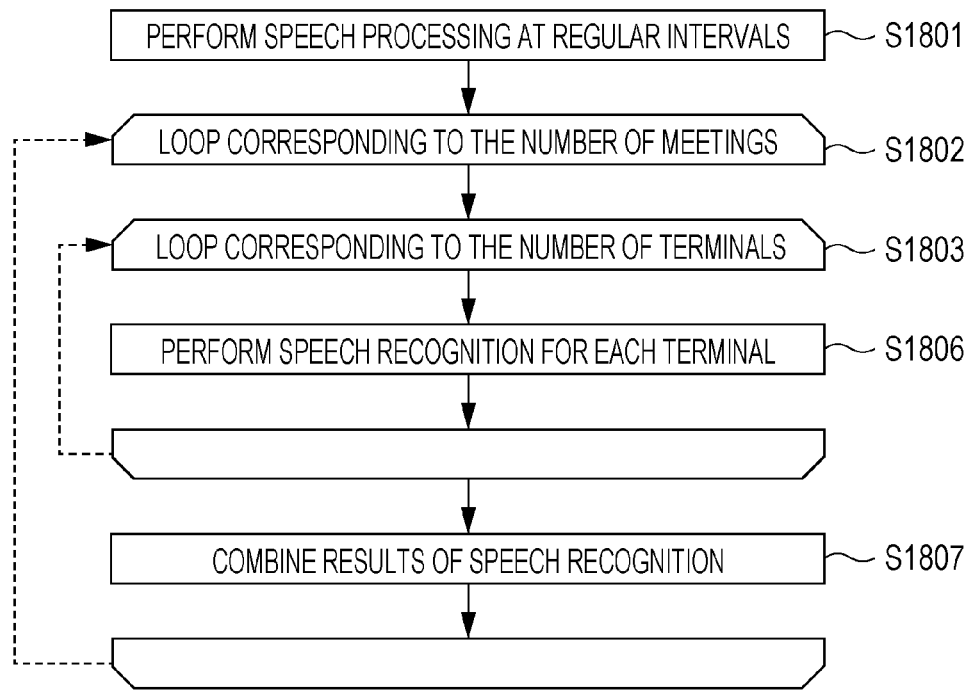
FIG. 18B is a flowchart illustrating one example of processing for creating minutes in the first embodiment.

One example of processing for speech data stored in the buffer allocated to each terminal, as described above, will now be described with reference to FIGS. 18A and 18B. FIG. 18A is a flowchart illustrating one example of processing for a remote meeting. FIG. 18B is a flowchart illustrating one example of processing for creating minutes.

An operation in FIG. 18A will be described first. Speech processing is started at regular time intervals (S1801). The time intervals depend on the amount of speech data that is buffered. The buffer is to compensate for a network delay between each terminal and the cloud server 609. When the buffer is small, that is, the speech processing is performed at small time intervals, the network delay cannot be compensated for, which causes loss of speech data. When the buffer is large, that is, the speech processing is performed at large time intervals, this causes delay in the processing. Appropriate time intervals are set according to a meeting-aid service to be provided.

In the speech processing, loop processing is performed a number of times corresponding to the number of meetings (S1802). In the loop processing, loop processing corresponding to the number of terminals that are participating in the meeting is further performed (S1803). During this loop processing, speech data accumulated for the respective terminals are read and combined for each meeting to create one piece of speech data (S1804). After the above-described processing is repeated the number of times corresponding to the number of terminals participating in the meeting, the combined speech data is transmitted to a terminal that is participating in a meeting at a remote place (S1805).

Next, a description will be given of an operation in FIG. 18B. In FIG. 18B, the same reference numerals as those in FIG. 18A represent the same or similar processes. In FIG. 18A, speech data are combined for each meeting to create one piece of speech data. However, in FIG. 18B, speech data is recognized for each terminal (S1806), and resulting text data are combined for each meeting (S1807). The combined text data is transmitted to a terminal is participating in the meeting.

The above-described speech processing is one example, and the speech processing may also be performed for another purpose.

In the flowchart in FIG. 17A, more specific details of the process (S1704) for measuring the degree of similarity of speech data will be described with reference to FIG. 11. FIG. 11 illustrates one example of speech data received from the terminals registered in the meeting table 1001 in the present embodiment. For example, in FIG. 11, speech data received from the terminals registered in the meeting table 1001 are schematically depicted (1101). In addition, speech data of a terminal X that has not yet been registered in the meeting table 1001 and that is a newly connected is schematically depicted (1102).

As depicted in 1101, three terminals, that is, a terminal A, a terminal B, and a terminal C, are registered for meeting 1, and two terminals, that is, a terminal D and a terminal E, are registered for meeting 2. Since terminals that belong to the same meeting collect the sound of a conversation made in the same meeting room, the terminals transmit similar speech data, although there is a certain difference due to differences of the positions where the terminals are placed. However, since the contents of a conversation differ from the contents of a conversation obtained by a terminal belonging to a different meeting, there is a significant difference between the speech data.

Through use of this characteristic, to which meeting the newly connected terminal X belongs is determined. That is, the degree of similarity between speech data resulting from sound collection performed by the terminal X and speech data resulting from sound collection performed by a terminal that belongs to each meeting is calculated, and the terminal that has collected speech data having the highest degree of similarity with the speech data resulting from the sound collection performed by the terminal X is identified. When the highest degree of similarity exceeds a threshold, it can be thought that the terminal X is placed in the meeting room for a meeting to which the identified terminal belongs (i.e., in the meeting room in which the identified terminal is placed). In this case, it is determined that the terminal X belongs to the same meeting as the meeting to which the identified terminal belongs.

When the highest degree of similarity does not exceed the threshold, it can be thought that the terminal X is not placed in any of the meeting rooms for the meetings to which the terminals registered in the meeting table 1001 belong.

Hence, a new meeting is entered in the meeting table 1001, and the terminal X is registered as a representative terminal or a participating terminal in the meeting.

The degree of similarity for each meeting may be calculated, for example, by determining the absolute values of differences between the speech data of the terminals (e.g., the terminals A, B, and C) that belong to the meeting and the speech data of the terminal X and determining an average value of the absolute values of the differences for the meeting. Rather than determining the average value, the absolute value of a difference from one terminal that serves as a representative in the meeting may also be determined. The terminal that serves as a representative may be set to, in the meeting, a terminal that transmitted speech data with a high level. When the level is high, the signal-to-noise (SN) ratio is generally large, and thus a more accurate degree of similarity can be calculated. Also, although the degree of similarity has been described as being calculated using the absolute value of the differences, the configuration method for the sound collection system is not limited thereto. Since the human takes breaths, utterances involve silent portions. A method for comparing the distribution of the silent portions may be used to determine the degree of similarity. In addition, after the speech data of the terminals are subjected to speech recognition to convert the utterances into character strings, the degree of match between the character strings may be determined and be used as the degree of similarity.

A method as described above is used to determine the degree of similarity between utterances made in a meeting and utterances whose sound was collected by the terminal X. When the highest degree of similarity among the determined degrees of similarity is larger than or equal to the threshold, the terminal X is regarded as belonging to the meeting with which the degree of similarity was determined, and the terminal X is added to the entry of the meeting in the meeting table 1001. When the highest degree of similarity is smaller than the threshold, this means that there is no conversation that is similar to the conversation whose sound was collected by the terminal X, and thus an entry of a new meeting in which only the terminal X is participating is created in the meeting table 1001.

The above-described method is a method for determining a meeting to which a terminal that is not registered in the meeting table 1001 belongs when the terminal is connected, by using the degree of similarity of the speech data. However, the configuration method for the sound collection system is not limited to the method described above. The degree of similarity of speech data resulting from sound collection performed by each terminal that has already been registered in the meeting table 1001 may always be determined. For example, the degrees of similarity of speech data resulting from sound collection performed by the terminals A, B, and C belonging to "meeting 1" in FIG. 11 may always be determined, and when the degree of similarity of the speech data of the terminal C becomes lower than those of the terminals A and B, the terminal C may be deleted from the entry of meeting 1. With such a method, when the owner of the terminal C leaves the meeting room with the terminal C while "meeting 1" is held therein, it is possible to prevent a problem that speech data unrelated to the meeting in which the terminal C performs sound collection is transmitted to another place for a meeting.

Figure 16:
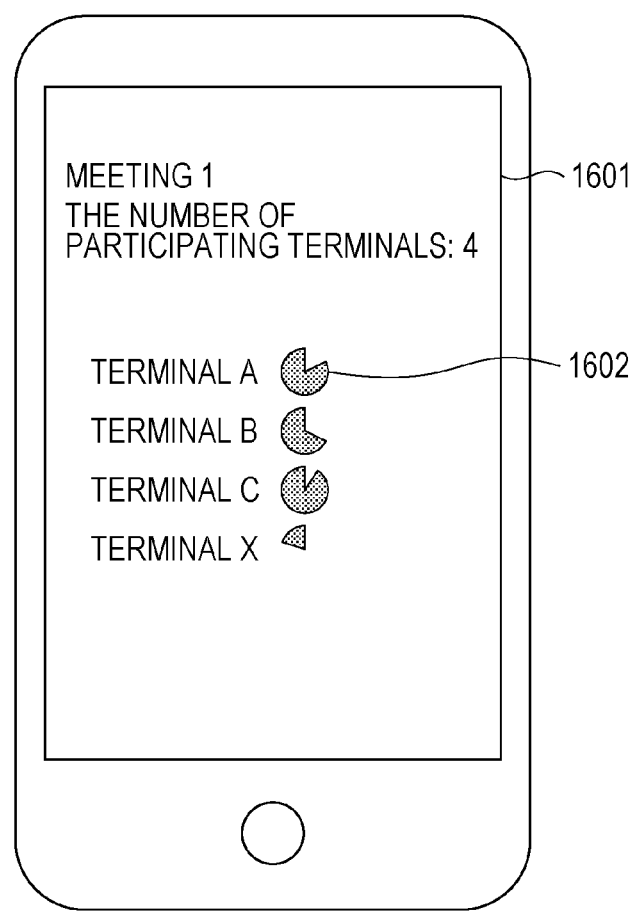
FIG. 16 is a schematic view illustrating one example of a display screen of one terminal in the configuration method for the sound collection system according to the present disclosure.

The degrees of similarity calculated by the above-described method may be transmitted to the terminals that are participating in the meeting and be displayed on the respective terminals. FIG. 16 is a schematic view illustrating one example of what is displayed on a display screen of a terminal that belongs to meeting 1. A screen 1601 in FIG. 16 shows that the number of terminals that are participating in meeting 1 is 4 and the states of the respective terminals are displayed. Each pie chart 1602 indicates the degree of similarity of speech data resulting from sound collection performed by the corresponding terminal. Performing such display allows a participant in the meeting to confirm that his or her terminal is participating in the meeting. Also, there is a possibility that a terminal whose degree of similarity is significantly lower than those of other terminals is deleted from the entry of the meeting, and in such a case, it is also possible to take measures, such as moving that terminal to a position where it is easier to collect the sound of utterances in the meeting. In addition, this technology is also effective for preventing wiretapping. This is described below in detail in conjunction with a third embodiment.

In FIGS. 17A and 17B, the degrees of similarity are determined for all meetings in order to determine a meeting to which the terminal X newly connected to the cloud server 609 belongs. However, for example, a position-locating function using a GPS may be used to determine the degree of similarity of only a meeting held near the location of the terminal X, thereby making it possible to reduce the amount of processing for determining the degree of similarity. The position can also be located by not only using a GPS but also using a MAC address of a wireless LAN station installed in the vicinity of a meeting room.

Although a meeting is identified when the degree of similarity is larger than or equal to the predetermined threshold in FIG. 17B (more specifically, step S1705), this threshold does not necessarily have to be a fixed value. For example, in FIG. 11, the degrees of similarity among the terminal A, the terminal B, and the terminal C that already belong to "meeting 1" may be measured, and a value that is the closest to the determined degree of similarity may be used as the threshold. When the meeting room is spacious or the amount of noise is large, the degrees of similarity among terminals belonging to the meeting are low from the beginning. Thus, with respect to a terminal that newly participates in the meeting, the meeting determination also needs to be performed with a low degree of similarity. However, when a small number of people are having a meeting in a small meeting room, the degree of similarity in speech among terminals belonging to the meeting is high. In this case, it is desired to determine a meeting by using a high degree of similarity that is equivalent to that degree of similarity. When the threshold for the degree of similarity is increased, it is possible to exclude a terminal that attempts to perform wiretapping outside the meeting room.

Figure 20:
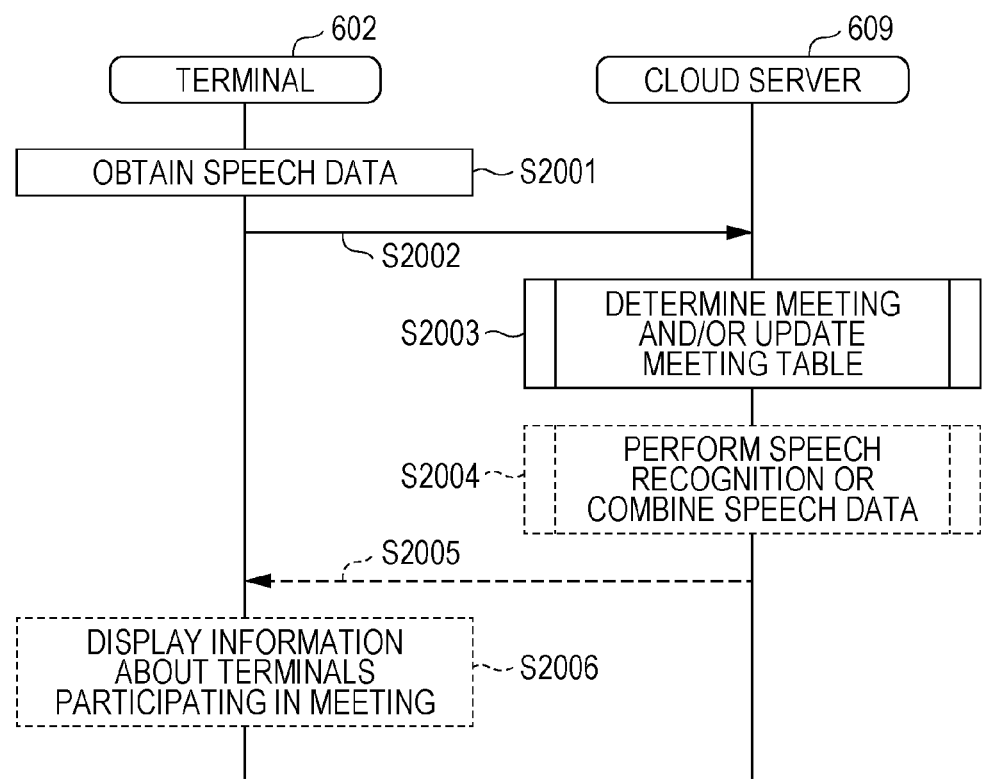
FIG. 20 is a sequence diagram illustrating one example of information exchange between one terminal and the cloud server in the sound collection system according to the present disclosure.

Next, a sequence of information exchange of devices in the sound collection system according to the present embodiment will be described with reference to FIG. 20. FIG. 20 is a sequence diagram illustrating one example of exchange of information between a terminal possessed by a participant that participates in a meeting (e.g., a representative terminal or participating terminal, which is simply referred to as a "terminal 602" in this example) and the cloud server 609 in the sound collection system according to the present embodiment.

First, in step S2001, speech data of a meeting is obtained using a microphone of the terminal 602 possessed by the participant in the meeting.

Next, in step S2002, the terminal 602 transmits the obtained speech data to the cloud server 609. The cloud server 609 receives the speech data through the Internet 608.

Next, in step S2003, the cloud server 609 determines a meeting to which the terminal 602 belongs and/or updates the meeting table 1001. The process in step S2003 is performed as described above with reference to the flowchart in FIG. 17A or 17B.

Next, in step S2004, the cloud server 609 performs speech recognition on the obtained speech data. In this case, speech data obtained by another terminal and the speech data obtained in step S2002 may be combined together. The other terminal is a terminal that belongs to the same meeting as that of the terminal 602 that transmitted the speech data obtained in step S2002 and that is different from the terminal 602 that transmitted the speech data obtained in steps S2002.

The process in steps S2004 is performed as described above with reference to the flowchart in FIG. 18A or 18B.

In step S2005, the cloud server 609 transmits, to the terminal 602, information about the meeting that is determined in step S2003 and to which the terminal 602 belongs. In this case, the cloud server 609 transmits a result of the speech recognition performed in step S2004 and/or the created minutes (FIG. 18B) to the terminal 602. Also, when the speech data are combined together in S2004, the combined speech data (FIG. 18A) may be transmitted to the terminal 602.

The information about the meeting that is determined in step S2003 and to which the terminal 602 belongs may be, for example, list information of all terminals belonging to the meeting to which the terminal 602 belongs.

Also, the result of the speech recognition performed in step S2004, the created minutes (FIG. 18B), and the combined speech data may be transmitted to another terminal belonging to a meeting different from the meeting to which the terminal 602 belongs.

For example, when a representative terminal in the meeting to which the terminal 602 belongs specifies, for the cloud server 609, the place where a remote meeting is to be held, the result of the speech recognition performed in step S2004, the created minutes, and the combined speech data may be transmitted to terminals (e.g., the representative terminal 604 and the participating terminals 605) belonging to the meeting corresponding to the meeting room at the specified place.

The terminal 602 receives the information transmitted by the cloud server 609. The terminal 602 that receives the information transmitted by the cloud server 609 may be the terminal that transmitted the speech data in step S2002 or may be another terminal belonging to the meeting determined to be the meeting to which the terminal 602 belongs. In the case of the remote meeting described above with reference to FIG. 18B, the information about the meeting, the information being transmitted in S2005, is received by a terminal that is different from the terminal that transmitted the speech data in step S2002 and that belongs to another meeting that is performing a remote meeting with the meeting determined to be the meeting to which the terminal 602 belongs.

In step S2006, the terminal 602 displays the information about the terminals (e.g., the representative terminal 601 and the participating terminals 602) that are participating in the meeting. The information that is displayed is similar to, for example, the information illustrated in FIG. 16. The information to be displayed is not limited to this example, and for instance, when the flowchart illustrated in FIG. 18B is executed to create minutes, the created minutes may be displayed.

The processes in steps S2004 to S2006 are not essential, and the timings of the processes are not limited to those illustrated in FIG. 20.

As described above, according to the present embodiment, in a system in which microphones included in general terminals (e.g., the representative terminal 601 and the participating terminals 602), such as smartphones, possessed by participants in, mainly, a meeting are used as microphones for the meeting to collect the sound of utterances of the participants, the degree of similarity of speech data resulting from sound collection performed by the terminals is used to perform setting for the terminals. Accordingly, when a meeting to which a terminal belongs is to be specified, it is not necessary to set a password and so on, and there is a special advantage that the risk of wiretapping is lower than performing pairing over radio waves.

Second Embodiment

In the first embodiment described above, during determination of a meeting to which a new terminal belongs, the degree of similarity between collected-sound data resulting from sound collection performed by the new terminal and collected-sound data resulting from sound collection performed by another terminal (a terminal for which the meeting it belongs is already determined) is measured, and the meeting to which the new terminal belongs is determined based on a result of the measurement.

In the first embodiment described above, for example, when a new terminal is placed in a meeting room for a meeting to which a terminal (e.g., a representative terminal or a participating terminal) registered with the cloud server 609 belongs, each of the new terminal and terminals belonging to the meeting held in the meeting room collects the sound of utterances made in the meeting, and thus the collected-sound data include the same speech data, so that the degree of similarity between the collected-sound data (speech data) is high. This characteristic is used to determine the meeting to which the new terminal belongs.

However, in order to implement this method, it is desirable that collected-sound data resulting from sound collection in a meeting always includes speech data. First of all, when no utterances are made, collected-sound data resulting from sound collection performed by a terminal does not include speech data. Hence, when collected-sound data does not include speech data, the degree of similarity cannot be measured. However, an event in which no speech data is collected can occur in practice, such as a case in which a conversation happens to be interrupted. A second embodiment provides a method for determining a meeting to which a new terminal belongs, even when such an event occurs.

Figure 12:
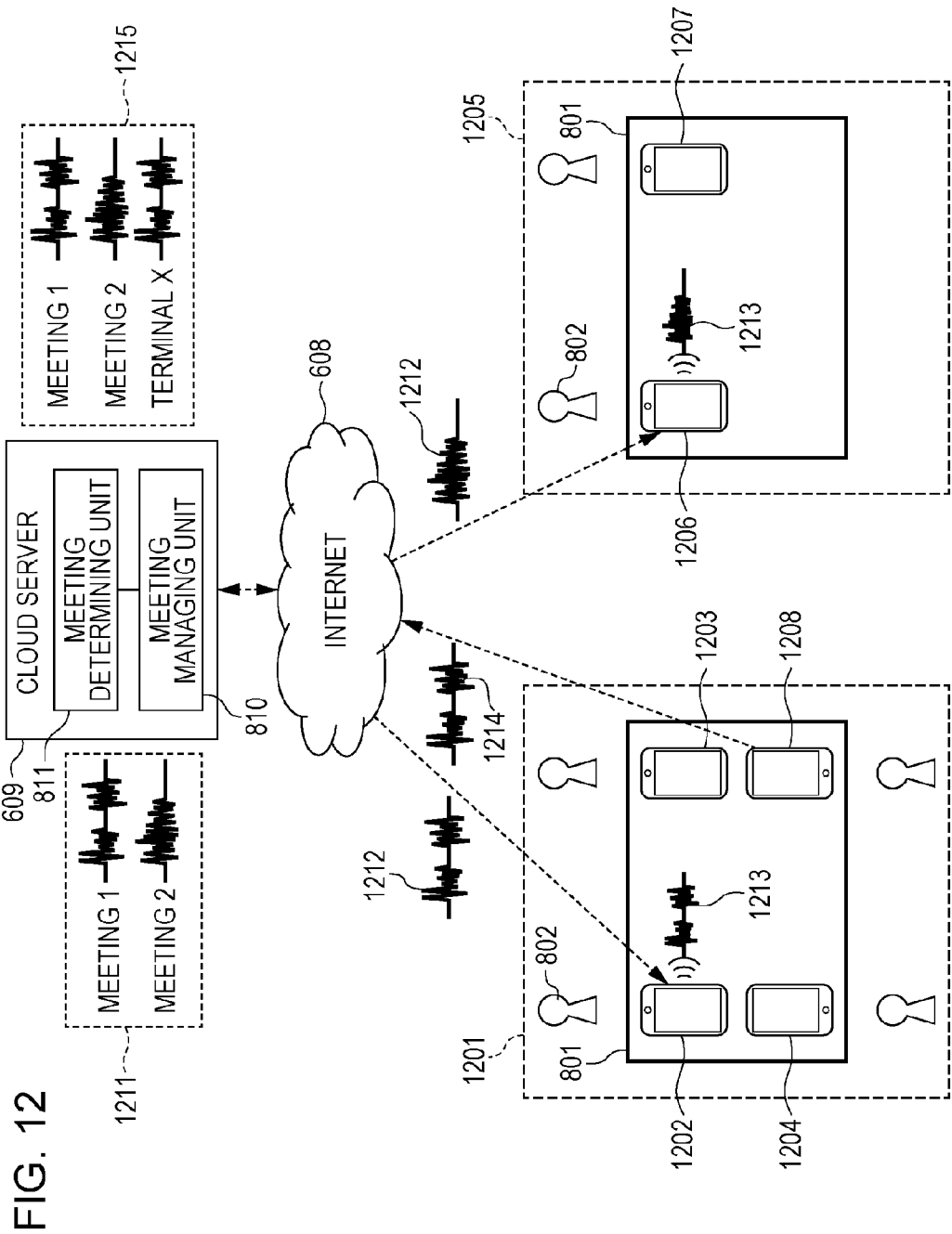
FIG. 12 is a diagram illustrating one example of the configuration of the sound collection system according to the present disclosure.

The second embodiment will be described with reference to FIG. 12. FIG. 12 is a diagram illustrating one example of the configuration of a sound collection system according to the present embodiment. In FIG. 12, the same reference numerals as those in FIG. 6 or 8 represent elements that are the same as or similar to those illustrated in FIG. 6 or 8. In FIG. 12, meeting 1 (1201) and meeting 2 (1205) are held at remote places. A terminal A (1202), a terminal B (1203), and a terminal C (1204) participate in meeting 1 (1201). On the other hand, a terminal D (1206) and a terminal E (1207) participate in meeting 2 (1205).

Figure 19:
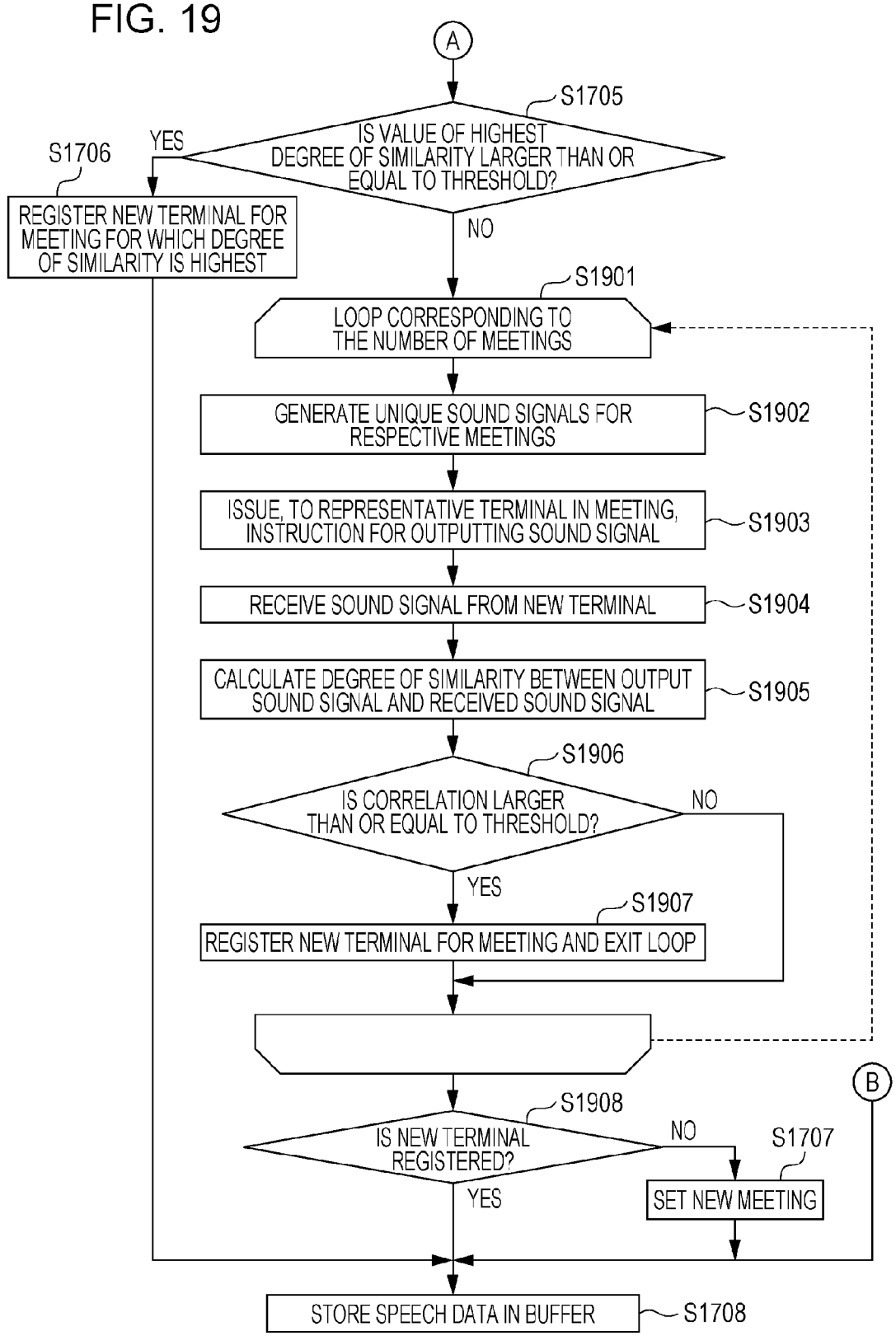
FIG. 19 is a flowchart illustrating one example of the operation of the sound collection system according to the present disclosure.

FIG. 19 is a flowchart illustrating one example of the operation of the sound collection system in the present embodiment. The example illustrated in FIG. 19 is a modification of the flowchart illustrated in FIG. 17B. In the operation of the sound collection system in the present embodiment, the operation of the flowchart illustrated in FIG. 17A is also performed in the present embodiment. In this case, a terminal X (1208) newly participates in meeting 1 (1201). In this system, although an attempt was made to determine a meeting to which the terminal X belongs, by using the method in the first embodiment, a participant 802 in meeting 1 (1201) happens to be silent and the detection of the degree of similarity of the speech data fails. That is, in this case, the value of the highest degree of similarity is smaller than the threshold in step S1705 in FIG. 17B. The operation in the second embodiment from step S1705 will be described with reference to FIGS. 12 and 19.

In FIG. 19, as described above, the value of the highest degree of similarity is smaller than the threshold (S1705). Thus, a loop corresponding to the number of meetings registered in the meeting managing unit 810 is started (S1901). In this loop, unique sound signals (meeting-room-determination sound signals) are generated for respective meetings (S1902). The sound signals may be, for example, sound signals including encoded numbers of serial numbers managed by the meeting managing unit 810.

These sound signals are schematically illustrated as sound signals 1211 in FIG. 12. The meeting determining unit 811 transmits a sound signal 1212 of the sound signals 1211 to a representative terminal (the terminal A or D) in each meeting room and issues, to the representative terminal, an instruction for outputting the sound signal 1212 by using the speaker included in the representative terminal (S1903). For example, upon receiving the instruction, the terminal A (1202), which is a representative terminal, outputs the sound signal 1212 (output 1213). Since the representative terminals in the meetings registered in the meeting table 1001 receive mutually different sound signals in step S1903, the sounds output from the speakers of the representative terminals are different from each other.

When the sounds corresponding to the sound signals 1212 are output from the speakers of the representative terminals, the terminal X (1208) collects external sound.

For example, in the example illustrated in FIG. 12, the terminal X is placed in the meeting room for meeting 1, and thus, when the terminal X collects external sound, the collected-sound data (or the sound signal) resulting from the sound collection includes data corresponding to the sound output from the speaker of the representative terminal (the terminal A) in meeting 1. In this case, when the collected-sound data (the sound signal) resulting from the sound collection performed by the terminal X is compared with the sound signal transmitted from the cloud server 609 to the representative terminal (the terminal A) in meeting 1, it is thought that the degree of similarity (a first degree of similarity) therebetween is high (or the correlation is high). Also, the collected-sound data (or the sound signal) resulting from the sound collection performed by the terminal X does not include data corresponding to the sound output from the speaker of the representative terminal (the terminal D) in meeting 2. In this case, when the collected-sound data (the sound signal) resulting from the sound collection performed by the terminal X is compared with the sound signal transmitted from the cloud server 609 to the representative terminal (the terminal D) in meeting 2, it is thought that the degree of similarity (a second degree of similarity) therebetween is low (or the correlation is low).

Although not illustrated in FIG. 12, for example, if the terminal X is in the meeting room for meeting 2 illustrated in FIG. 12 and collects external sound, collected-sound data resulting from the sound collection includes data corresponding to sound (the sound signal) output from the speaker of the representative terminal (the terminal D) in meeting 2. In this case, when the collected-sound data (the sound signal) resulting from the sound collection performed by the terminal X is compared with the sound signal transmitted from the cloud server 609 to the representative terminal (the terminal D) in meeting 2, it is thought that the degree of similarity (a first degree of similarity) therebetween is high (or the correlation is high). Also, the collected-sound data (or the sound signal) resulting from the sound collection performed by the terminal X does not include data corresponding to the sound output from the speaker of the representative terminal (the terminal A) in meeting 1. In this case, when the collected-sound data (the sound signal) resulting from the sound collection performed by the terminal X is compared with the sound signal transmitted from the cloud server 609 to the representative terminal (the terminal A) in meeting 1, it is thought that the degree of similarity (a second degree of similarity) therebetween is low (or the correlation is low).

Also, although not illustrated in FIG. 12, for example, when the terminal X is not in either of the meeting rooms for meetings 1 and 2 illustrated in FIG. 12, the terminal X does not collect sound output from the speaker of the representative terminal (the terminal A) in meeting 1 and sound output from the speaker of the representative terminal (the terminal D) in meeting 2. Accordingly, when the threshold is set to a value that is larger than the second degree of similarity and that is smaller than the first degree of similarity, the cloud server (more concretely, the meeting managing unit 810) can determine to which meeting the terminal X that has newly participated belongs (or in which meeting room the terminal X is placed) or determine whether or not the meeting is a new unregistered meeting.

For example, when the terminal X is not in either of the meeting rooms for meetings 1 and 2 illustrated in FIG. 12, even if the terminal X collects sound output from the speaker of the representative terminal (the terminal A) in meeting 1 and sound output from the speaker of the representative terminal (the terminal D) in meeting 2, the levels of signals of the collected sounds are smaller than those in the case in which the terminal X is in the meeting room therefor.

The terminal X (1208) transmits the collected-sound data (the sound signal) resulting from the external sound collection to the cloud server 609 (output 1214).

Although different reference numerals are given to the sound signal 1211, the sound signal 1212, the output 1213, and the output 1214, they are basically the same or similar signals. The meeting determining unit 811 receives the sound signal from the terminal X (1208) (S1904). At determination 1215 in FIG. 12, a process of comparing the received sound signal with the created sound signal 1211 is schematically depicted. The degree of similarity between the sound signals unique to the respective meetings, the signals being created in 1902, and the received sound signal is calculated (S1905). If the degree of similarity is larger than or equal to a threshold (S1906), the terminal X is registered for the meeting on which the loop processing is to be executed, and then the process exits the loop (S1907). The threshold may be set to a value with which it is possible to determine that the terminal X belongs to the meeting on which the loop processing is to be executed (i.e., the terminal X is placed in the meeting room for the meeting on which the loop processing is to be executed). When a meeting to which the terminal X belongs has not been determined (S1908) after the process exits the loop, an entry of a new meeting to which the terminal X belongs is created (S1707).

As described above, the second embodiment is analogous to the first embodiment in that collected-sound data resulting from sound collection performed by the terminal X is used to determine a meeting to which the terminal X belongs.

The second embodiment differs from the first embodiment in that, in the first embodiment, speech data that is included in collected-sound data and that corresponds to utterances of participants in a meeting is used to determine a meeting to which the terminal X belongs, whereas, in the second embodiment, sound output from the speaker of a representative terminal in a meeting registered with the cloud server 602 (i.e., in the meeting table 1001) is used to determine a meeting to which the terminal X belongs.

With this configuration, even under a situation in which participants in a meeting are silent and the collected-sound data does not include speech for which the degree of similarity is to be determined, it is possible to determine a meeting to which the terminal X belongs. Also, since the sound signals created by the meeting determining unit 811 are collected in order to determine the degree of similarity, it is easy to determine the degree of similarity, compared with a case in which the sound of normal utterances in a meeting is collected.

Although, in the second embodiment, the method in the second embodiment is executed only when the meeting is not determined using the method in the first embodiment, the meeting may also be determined using only the method in the second embodiment.

For example, an ultrasonic wave that is not audible by the human ear may also be used for the sound signals created by the meeting determining unit 811. Use of an ultrasonic wave makes it possible to prevent a participant who listens to sound for determining the degree of similarity from feeling uncomfortable.

Also, before the sound signal transmitted from the cloud server 609 is output from the speaker of the representative terminal, guidance "Sound for terminal connection is output from now. Please be as quiet as possible." may also be output from the speaker of the representative terminal to the participants in the meeting. With this arrangement, the participants become silent before the sound signal is output from the speaker of the representative terminal, and they can hear only the output of the sound signal. Thus, the signal-to-noise (SN) ratio increases, thereby making it possible to improve the accuracy of determining the degree of similarity.

Although, in the second embodiment, the sound signal is output from the speaker of the representative terminal, the sound signal may be output using the speaker of another terminal (e.g., a participating terminal) participating in the meeting.

In addition, the sound signals may be used not only for determining a meeting to which a new terminal belongs, but also for another purpose. For example, other terminals for which a meeting to which they belong has already been determined also collect external sound and transmit collected-sound data (the sound signal) to the cloud server 609. It is already known that the collected-sound data are results of sound collection of the same sound signal output from the representative terminal in the meeting to which the terminals belong. Thus, when the cloud server 609 analyzes a difference in the collected-sound data, it is possible to identify characteristics in sound collection of the microphones of the terminals. When the speech data resulting from the sound collection are adjusted so as to cancel out the characteristics, all of the terminals belonging to the meeting can perform sound collection with the same characteristic. This improves, for example, the sound quality in a remote meeting. Also, when a temporal delay of the sound signal resulting from sound collection performed by each terminal is analyzed, it is possible to determine a physical distance between a representative terminal that outputs the sound signal and another terminal (e.g., a participating terminal) that belongs to the same meeting as the meeting to which this representative terminal belongs or a terminal (e.g., a representative terminal or a participating terminal) that belongs to a meeting that is performing a remote meeting with the meeting to which the representative terminal belongs. This can be utilized to identify the relative position of a participant at the other side in the remote meeting.

Next, a sequence of information exchange of devices in the sound collection system in the present embodiment will be described with reference to FIG. 21.

Figure 21:
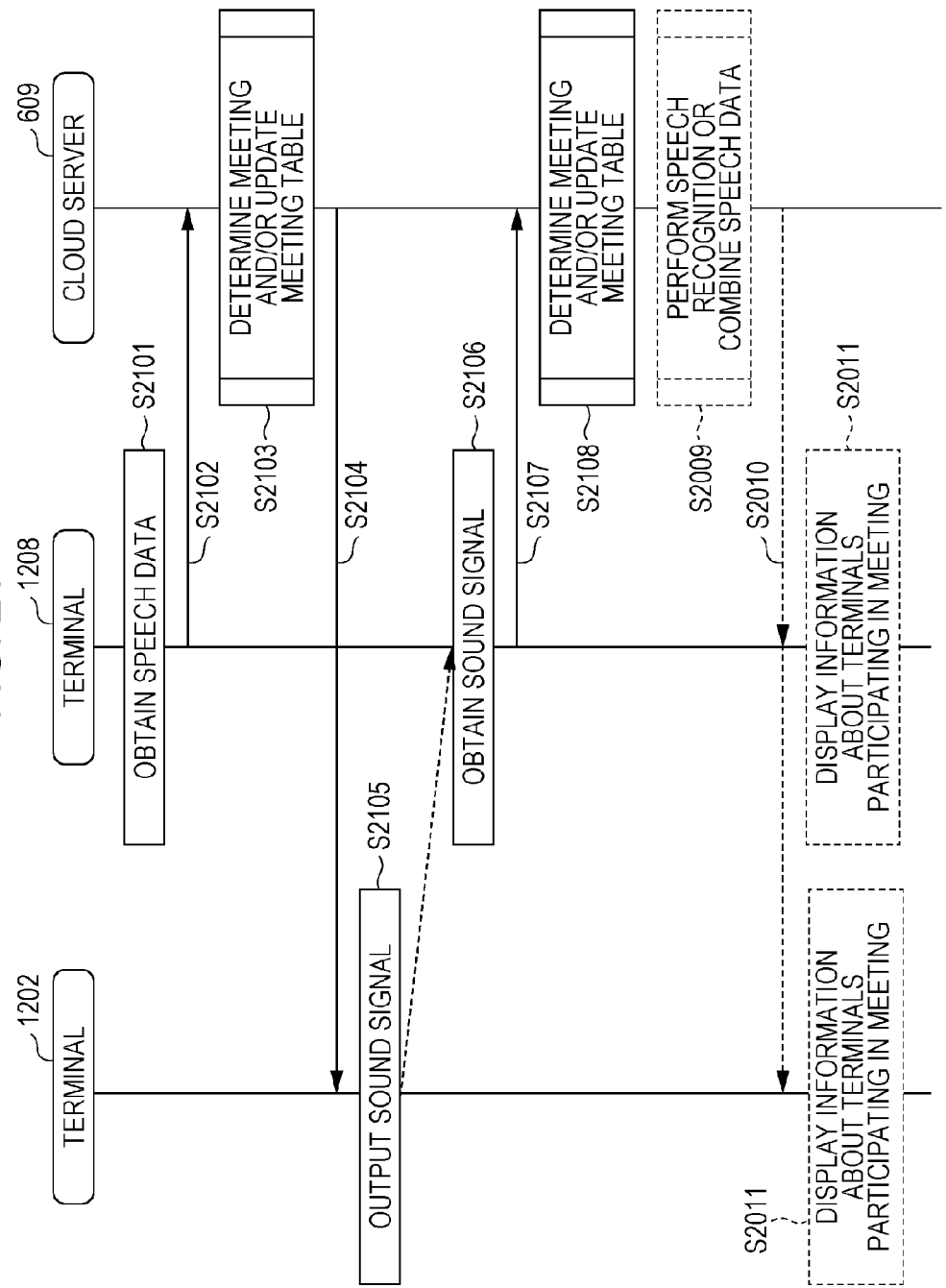
FIG. 21 is a sequence diagram illustrating one example of information exchange among the terminals and the cloud server in the sound collection system according to the present disclosure.

Since processes in steps 2101 to 2103 in FIG. 21 are analogous to the processes in steps 2001 to 2003 described above with reference to FIG. 20, descriptions thereof are not given hereinafter. It is assumed in this case that, after the degree of similarity is determined be smaller than the threshold in step S1705 included in step S2103 and illustrated in FIG. 17B, the processing has proceeded from step S1901 to step S1902 in the flowchart illustrated in FIG. 19.

In step S2104, the cloud server 609 issues, to a terminal 1202 that is a terminal different from the terminal that transmitted the speech data in step S2102 and that is a representative terminal in a meeting, an instruction for outputting a created sound signal (a meeting-determination sound signal). In step S2104, the cloud server 609 may also issue, to a terminal (e.g., a participating terminal) other than the terminal 1202, an instruction for outputting the created sound signal (the meeting-determination sound signal). Step S2104 corresponds to step S1903 illustrated in FIG. 19. The terminal 1202 receives the instruction from the cloud server 609.

Next, in step S2105, in accordance with the received instruction, the terminal 1202 outputs the sound signal via the speaker of the terminal 1202.

Next, in step S2106, when the terminal 1202 outputs the sound signal via the speaker in step S2105, the terminal 1208 obtains collected-sound data (or the sound signal) resulting from external-sound collection, for example, by using the microphone of the terminal 1208.

When the terminals 1202 and 1208 are in the meeting room for the same meeting, the collected-sound data resulting from the sound collection performed by the terminal 1208 includes the sound signal output from the speaker of the terminal 1202.

When the terminals 1202 and 1208 are not in the meeting room for the same meeting, the collected-sound data resulting from the sound collection performed by the terminal 1208 does not include the sound signal output from the speaker of the terminal 1202.

When the terminals 1202 and 1208 are not in the meeting room for the same meeting, even if the collected-sound data resulting from the sound collection performed by the terminal 1208 includes the sound signal output from the speaker of the terminal 1202, the level of the signal is low.

Next, in step S2107, the terminal 1208 transmits the sound signal obtained in step S2106 to the cloud server 609. The cloud server 609 obtains the sound signal transmitted by the terminal 1208. Step S2107 corresponds to step S1904 illustrated in FIG. 19.

Next, in step S2108, the cloud server 609 determines a meeting to which the terminal 1208 belongs and/or updates the meeting table 1001, on the basis of the sound signal received in step S2107. The process in steps S2108 is performed as described above in steps S1904 to S1908 illustrated in FIG. 19.

Since the processes in steps S2009 to S2011 are analogous to the processes in steps S2004 to S2006 described above with reference to FIG. 20, descriptions thereof are not given hereinafter.

As described above, in the present embodiment, in a system in which microphones included in general terminals, such as smartphones, possessed by participants in, mainly, a meeting, are used to collect utterances of the participants during the meeting, a sound signal (the meeting-room-determination sound signal) generated by the cloud server 609 is transmitted to a representative terminal, and when the representative terminal outputs the received sound signal by using the speaker included in the representative terminal, a new terminal X collects external sound and transmits collected-sound data (or the sound signal) resulting from the sound collection to the cloud server 609.

The cloud server 609 sets a new terminal (e.g., determines to which meeting a new terminal belongs) in accordance with the degree of similarity between the collected-sound data (or the sound signal) resulting from sound collection performed by the terminal X and the sound signal (the meeting-room-determination sound signal) used by the representative terminal for outputting.

Accordingly, in addition to the advantages in the first embodiment, there is a special advantage that a meeting to which a new terminal belongs can be determined regardless of whether or not utterances are made in a meeting room.

Third Embodiment

One of the problems to be overcome by the embodiments described above is wiretapping, and a third embodiment is intended to more reliably prevent wiretapping.

Figure 13:
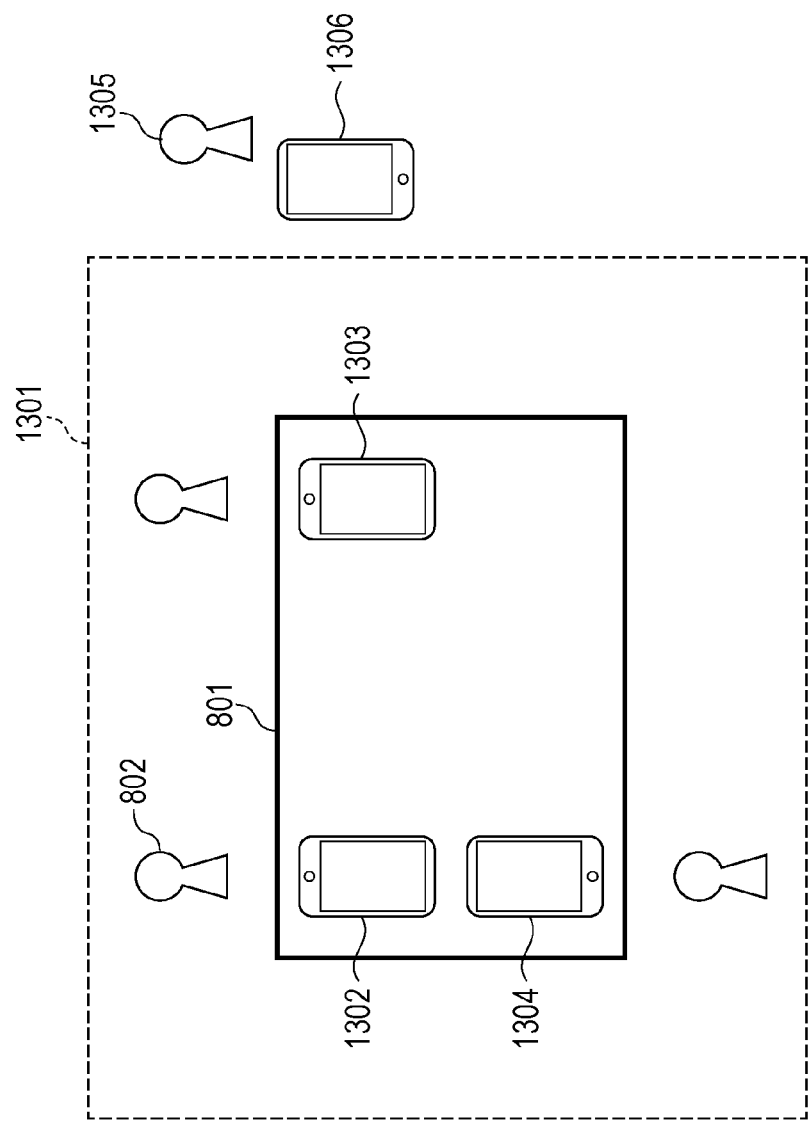
FIG. 13 is a diagram illustrating a problem with a sound collection system according to the present disclosure.

FIG. 13 is a diagram illustrating a state in which wiretapping is possible. The same reference numerals as those in FIG. 8 represent the same or similar elements. In FIG. 13, a terminal A (1302), a terminal B (1303), and a terminal C (1304) are in a meeting in a meeting room 1301. In this case, it is assumed that a malicious person 1305 who is outside the meeting room 1301 placed his or her terminal Z (1306) for wiretapping near the wall of the meeting room 1301 and has connected to the cloud server 609.

In this case, when the method in the first embodiment is used, the terminal Z (1306) collects the sound of utterances made in the meeting room 1301 and transmits the collected sound to the cloud server 609 as speech data, and the meeting determining unit 811 determines the degree of similarity of the speech data to thereby determine a meeting. Since the terminal Z (1306) is present outside the meeting room 1301, it cannot generally successfully collect the sound of utterances made in the meeting room 1301. As a result, the degree of similarity is low, and thus the terminal Z cannot participate in the meeting. However, when the wall of the meeting room 1301 is very thin, the sound collection may succeed to allow the terminal Z (1306) not intended by the participant 802 in the meeting to participate in the meeting. Consequently, for example, when the participant 802 is using a minutes creation service, the minutes that are supposed to be confidential are also transmitted to the terminal Z (1306) of the malicious person 1305, which leads to a big problem.

Figure 14:
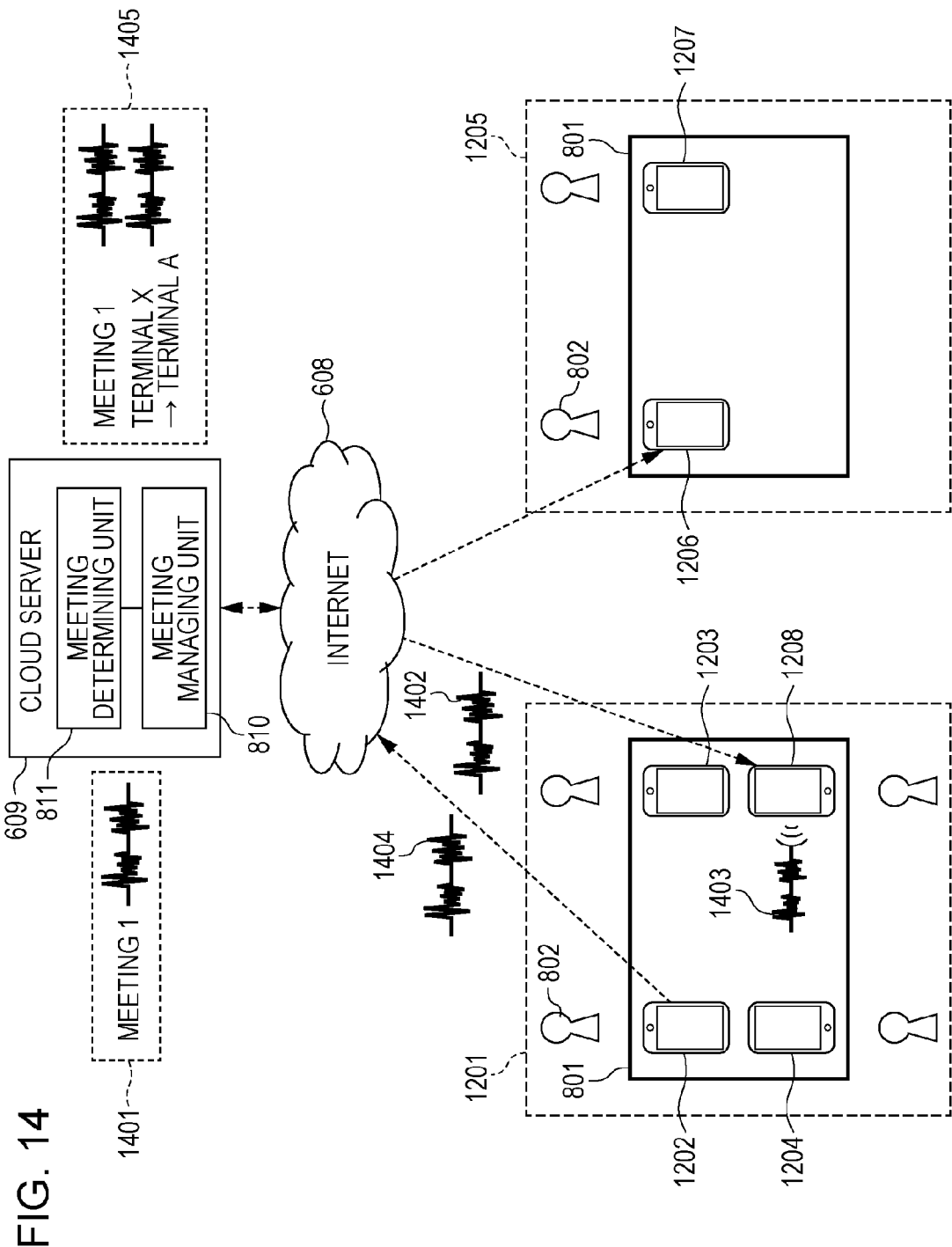
FIG. 14 is a diagram illustrating one example of the sound collection system according to the present disclosure.

In the third embodiment, a method for preventing such wiretapping will be described with reference to FIG. 14. FIG. 14 is a diagram illustrating one example of the sound collection system according to the present disclosure. Since FIG. 14 is substantially the same as FIG. 12, a description thereof is not given hereinafter. Now, it is assumed that a terminal X (1208) newly participates in meeting 1 (1201), and it has been determined that the meeting to which the terminal X (1208) belongs is meeting 1 (1201), by using the method in the first or second embodiment. The third embodiment further employs a method for checking whether or not the terminal X (1208) is certainly present in the meeting room. That is, the meeting determining unit 811 creates sound signals 1401 for checking. This sound signals 1401 may be the same as or similar to the sound signals 1211 created so as to be unique to the respective meetings in the second embodiment. The meeting determining unit 811 transmits a sound signal 1402 of the created sound signals 1401 to the terminal X (1208). The terminal X (1208) receives the sound signal 1402 and outputs a sound signal 1403 via the speaker of the terminal X (1208).

When the terminal X (1208) outputs the sound signal 1403 via the speaker, the terminal A (1202) that is a representative terminal participating in meeting 1 (1201) collects external sound.

Collected-sound data (or the sound signal) 1404 resulting from the sound collection of the sound signal 1403 output from the terminal X (1208) is transmitted to the cloud server 609. The meeting determining unit 811 determines the degree of similarity between the received collected-sound data 1404 and the sound signal 1402 that the terminal X (1208) was requested to output (determination 1405). If the degree of similarity is larger than or equal to a threshold, the meeting determining unit 811 determines that the terminal X (1208) belongs to meeting 1 (1201).

In the method in the third embodiment described above, in the first and second embodiments, after a meeting to which a new terminal belongs is determined, this new terminal outputs a sound signal (a meeting-checking sound signal) via the speaker, another terminal that is already participating in the meeting collects the sound, and the collected sound is compared with the output sound signal, thereby checking whether or not the new terminal certainly belongs to the meeting. The cloud server 609 may generate list information including a new terminal and a terminal (e.g., a representative terminal or a participating terminal) that belongs to the same meeting as the meeting to which the new terminal belongs and may transmit the list information to the other terminal. Upon receiving the list information, the other terminal may display the list information on a display (not illustrated) thereof.

With this method, it is possible to overcome two issues. A first one is that it is possible to check whether or not a newly connected terminal certainly belongs to the meeting. A second one is that, since a newly connected terminal outputs sound for checking, it is possible to make participants in the same meeting notice the terminal for which a meeting to which it belongs is determined.

Figure 15:
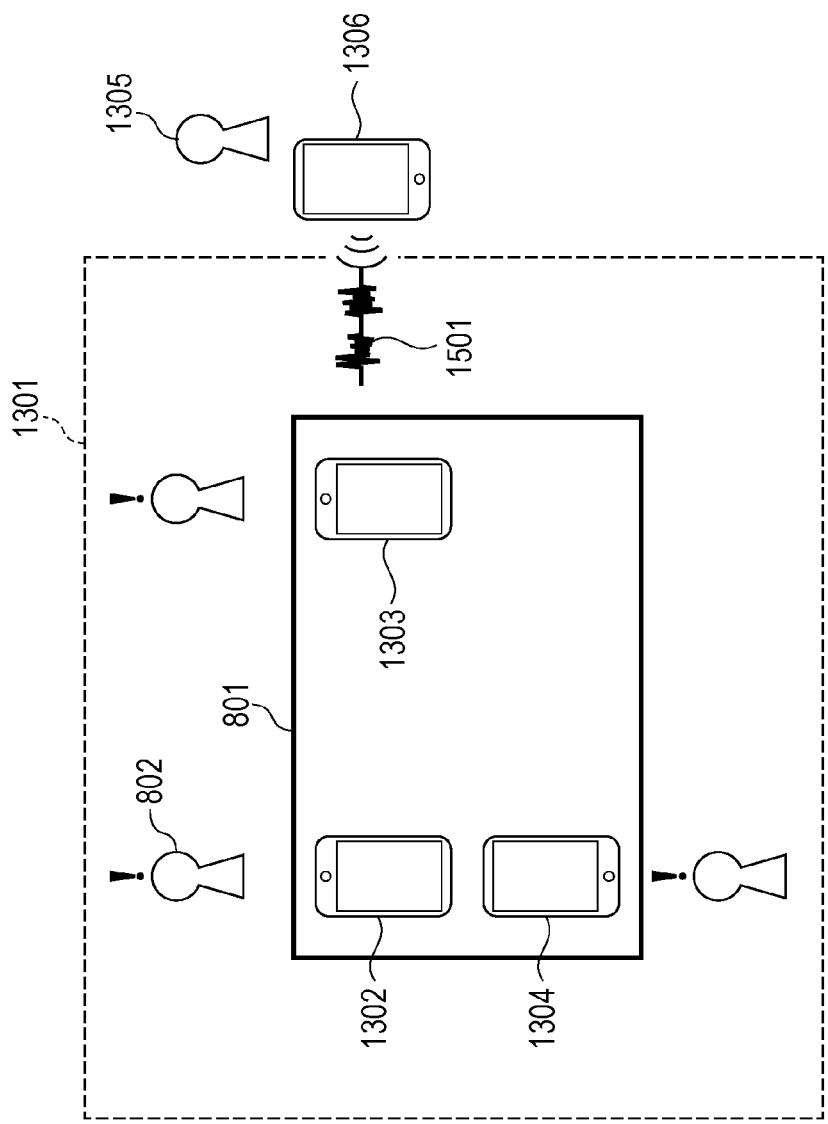
FIG. 15 is a diagram illustrating an advantage of the sound collection system according to the present disclosure.

An advantage of overcoming the second issue will now be described with reference to FIG. 15. FIG. 15 is almost the same as FIG. 13 and illustrates a state in which the terminal Z (1306) is attempting to perform wiretapping. In this case, the method in the third embodiment is used to determine a meeting to which the terminal Z (1306) belongs. As described above, the terminal Z (1306) outputs a sound signal for checking (1501). When another terminal (e.g., the terminal A (1302)) that is participating in the meeting 1301 does not collect the sound of the sound signal, the terminal Z (1306) cannot participate in the meeting 1301. However, naturally, that sound is also heard by the participant 802 in the meeting 1301. The participant 802 in the meeting 1301 listens to the sound for checking which is heard from the opposite side of the wall of the meeting room and notices that wiretapping is being performed, thus making it possible prevent an action of the malicious person 1305.

When each terminal performs display as described in the first embodiment and illustrated in FIG. 16, it is further helpful to prevent wiretapping. In FIG. 16, the number of participating terminals (e.g., the number of terminals registered for meeting 1 registered in the meeting table 1001) is 4. In this case, if three participants are actually participating in meeting 1, that is, only three terminals are brought into the meeting room for meeting 1, as illustrated in FIG. 15, and information indicating that the number of participating terminals is 4 is displayed, then the participants in meeting 1 can notice that there is a possibility that wiretapping is being performed somewhere.

Also, in FIG. 16, the degree of similarity of the terminal X is significantly lower than those of the other terminals. This indicates that there is a possibility that the terminal X is performing wiretapping at the opposite side of the wall of the meeting room, like the terminal Z (1306) illustrated in FIG. 15.

For example, a terminal whose degree of similarity is significantly lower than those of other terminals may be displayed in a color different from that for the other terminals. Such display is even more effective in bringing the wiretapping terminal to the participants' attention.

Next, a sequence of information exchange of devices in the sound collection system in the present embodiment will be described with reference to FIG. 22.

Figure 22:
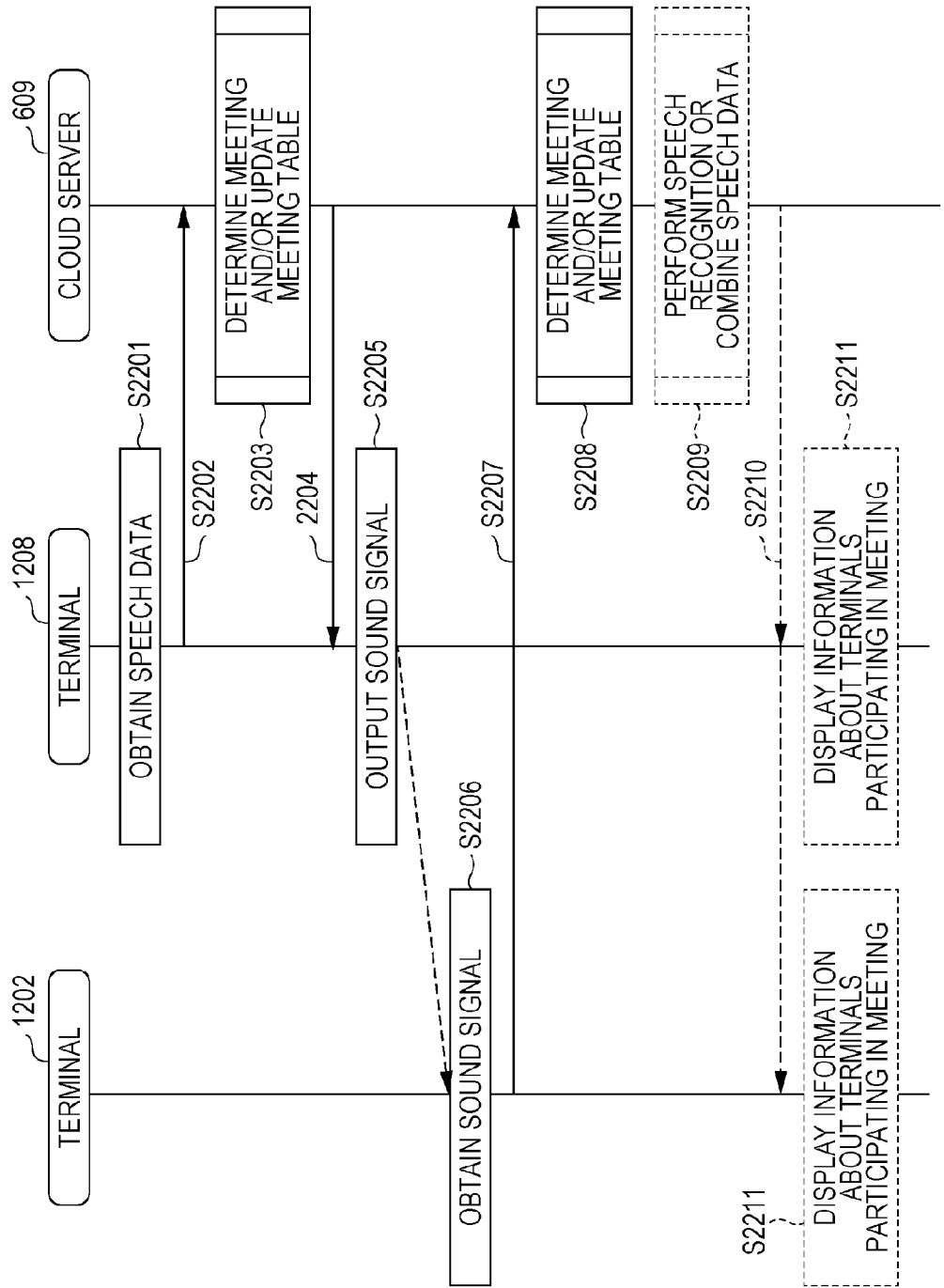
FIG. 22 is a sequence diagram illustrating one example of information exchange among the terminals and the cloud server in the sound collection system according to the present disclosure.

Since processes in steps 2201 to 2203 in FIG. 22 are analogous to the processes in steps 2001 to 2003 described above with reference to FIG. 20, descriptions thereof are not given hereinafter. It is assumed in this case that it has been determined that the degree of similarity is larger than or equal to the threshold in step S1705 illustrated in FIG. 17B or step S1705 or S1906 illustrated in FIG. 19, steps S1705 and S1906 being included in step S2203.

In step S2204, the cloud server 609 transmits, to the terminal 1208 that transmitted the speech data in step S2202, an instruction for outputting the created sound signal (the meeting-checking sound signal).

In step S2205, the terminal 1208 outputs the sound signal in accordance with the received instruction.

Next, in step S2206, the terminal 1202 obtains the sound signal output by the terminal 1208 in step S2205.

Next, in step S2207, the terminal 1202 transmits the sound signal, obtained in step S2206, to the cloud server 609. The cloud server 609 obtains the sound signal transmitted by the terminal 1202.

Next, in step S2208, the cloud server 609 checks whether or not it is correct that the meeting for which the degree of similarity was determined to be larger than or equal to the threshold in step S1706 or S1906 in FIG. 17B or FIG. 19, steps S1706 and S1906 being included in step S2203, is the meeting to which the terminal 1208 belongs. That is, if the degree of similarity between the speech obtained by the terminal 1208 in step S2203 and the speech in meeting 1 is determined to be high, and the sound signal is obtained from the terminal 1202 that belongs to meeting 1 in step S2207, then it is possible to confirm that the terminal 1208 certainly belongs to meeting 1. On the other hand, if the degree of similarity between the speech obtained by the terminal 1208 in step S2203 and the speech in meeting 1 is determined be high, and a sound signal from a terminal 1202 that belongs to a meeting other than meeting 1 is obtained in step S2207, then it is not possible to confirm that the terminal 1208 belongs to meeting 1. In this case, the processes in steps S2201 to S2208 may be performed again.

Figure 23:
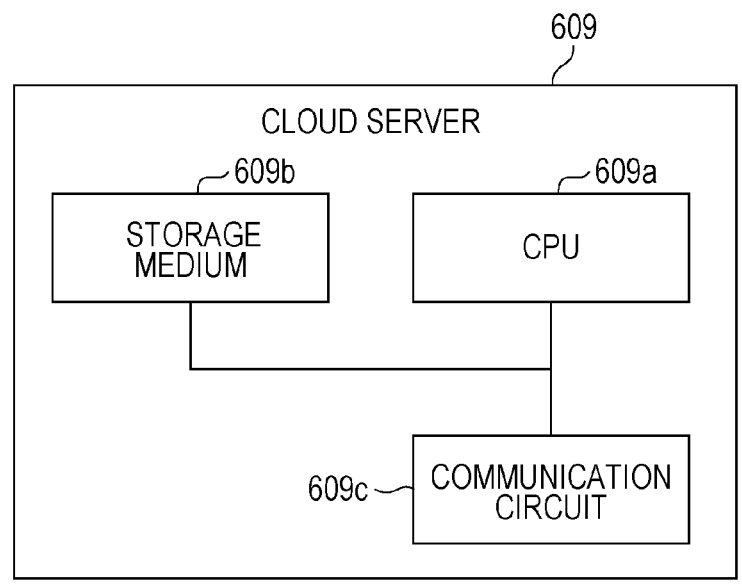
FIG. 23 is a block diagram illustrating one example of the hardware configuration of the cloud server according to the present embodiment.

Now, a description will be given of the hardware configuration of the cloud server 609 described above in the first to third embodiments. FIG. 23 is a block diagram illustrating one example of the hardware configuration of the cloud server 609 according to the present embodiment.

The cloud server 609 is, for example, a computer having a central processing unit (CPU) 609a corresponding to a processor, a storage medium 609b in which a control program is stored, and a communication circuit 609c.

The communication circuit 609c transmits data to a representative terminal and a communications terminal through the Internet and receives data from the representative terminal and the communications terminal.

The storage medium 609b is, for example, a memory. The "memory" in this case is, for example, a read only memory (ROM), a random access memory (RAM), or a hard disk.

When the CPU 609a executes the control program recorded in the storage medium 609b, the computer functions as the cloud server 609 (or the blocks included in the cloud server 609 function).

Although a configuration in which the CPU 609a executes the control program to cause the computer to function as the cloud server 609 has been described in FIG. 23, the present disclosure is not limited thereto.

For example, the functions of the blocks included in the cloud server 609 may be realized using a dedicated signal processing circuit (not illustrated). This signal processing circuit includes, for example, an application-specific integrated circuit (ASIC), a field programmable gate array (FPGA), or the like.

The CPU 609a may execute a program for the functions of some of the blocks included in the cloud server 609. The functions of the other blocks may be realized using a dedicated signal processing circuit.

Figure 24:
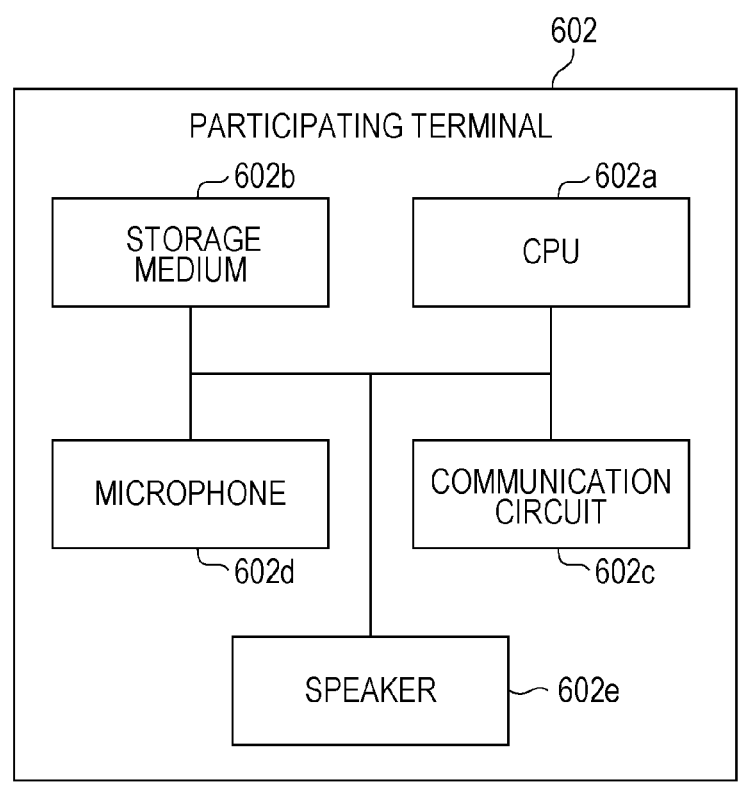
FIG. 24 is a block diagram illustrating one example of the hardware configuration of a participating terminal according to the present embodiment.

Now, a description will be given of the hardware configuration of the participating terminals described above in the first to third embodiments. FIG. 24 is a block diagram illustrating one example of the hardware configuration of each participating terminal 602 in this embodiment.

The participating terminal 602 is, for example, a computer having a CPU 602a corresponding to a processor, a storage medium 602b in which a control program is stored, a communication circuit 602c, a microphone 602d, and a speaker 602e.

The communication circuit 602c transmits data to the cloud server 609 through the Internet and receives data from the cloud server 609.

The storage medium 602b is, for example, a memory. The "memory" in this case is, for example, a ROM, a RAM, or a hard disk.

The CPU 602a executes the control program recorded in the storage medium 602b to control the communication circuit 602c, the microphone 609d, and the speaker 602e and to cause the computer to function as the participating terminal 602.

Although the configuration in which the CPU 602a executes the control program to cause the computer to function as the participating terminal 602 has been described in FIG. 24, the present disclosure is not limited thereto.

For example, the configuration may be realized using a dedicated signal processing circuit (not illustrated) corresponding to the control program. This signal processing circuit includes, for example, an ASIC, an FPGA, or the like. Although the hardware configuration of the participating terminal 602 has been described in FIG. 24, the hardware configuration of the participating terminal 605 is also the same as or similar to that of the participating terminal 602, and thus a description thereof is not given hereinafter.

In addition, since the hardware configurations of the representative terminals 601 and 604 are also the same as or similar to that described in FIG. 24, a description thereof is not given hereinafter.

Fourth Embodiment

The technology described in the above aspects can be realized, for example, by the following types of cloud service. However, the types of service for which the technology described in the above aspects is realized are not limited to the types described below.

(Service Type 1: Inhouse Data Center Type)

Figure 2:
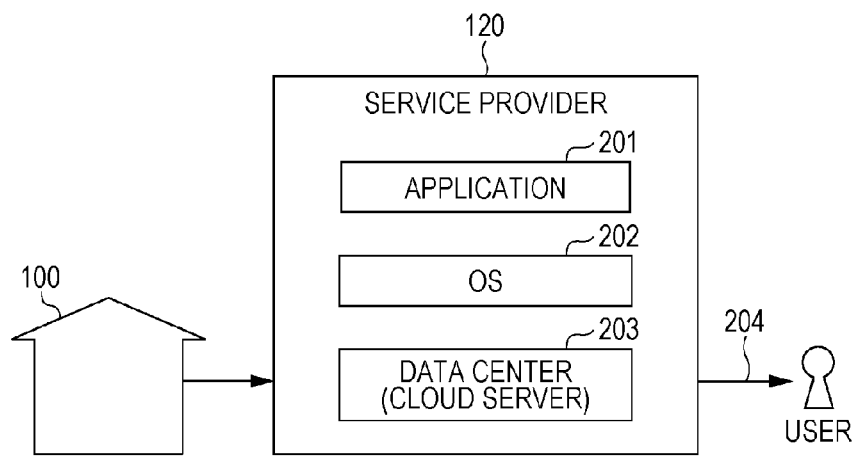
FIG. 2 is a diagram illustrating a first form of a service provided in the configuration method for the sound collection system according to the present disclosure.

FIG. 2 illustrates service type 1 (an inhouse data center type). This type is a type in which a service provider 120 obtains information from a group 100 and provides a user with a service. In this type, the service provider 120 has functions of a data-center operating company. That is, the service provider 120 has a cloud server 111 that manages big data. Thus, no data-center operating company exists.

In this type, the service provider 120 operates and manages a data center 203 (the cloud server 111). The service provider 120 manages an operating system (OS) 202 and an application 201. The service provider 120 uses the OS 202 and the application 201, managed by the service provider 120, to provide a service 204.

(Service Type 2: IaaS Usage Type)

Figure 3:
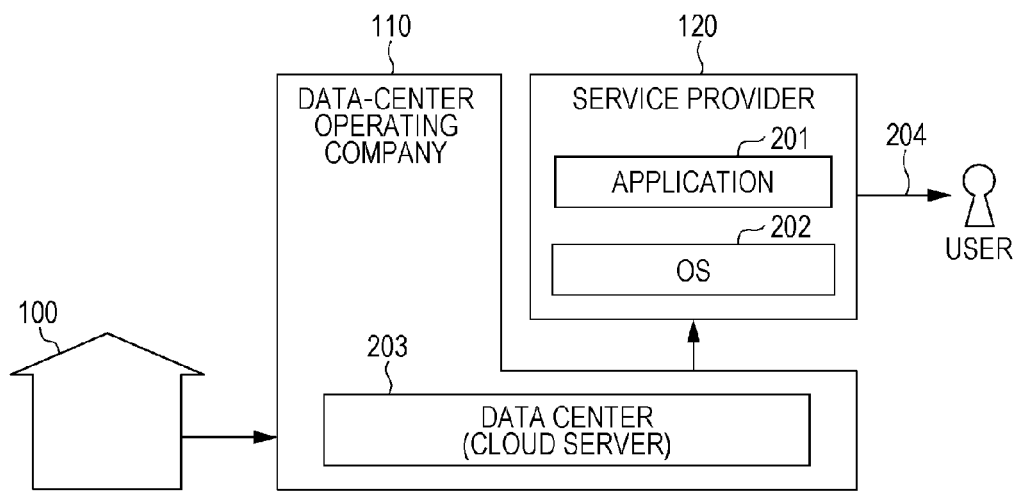
FIG. 3 is a diagram illustrating a second form of the service provided in the configuration method for the sound collection system according to the present disclosure.

FIG. 3 illustrates service type 2 (an IaaS usage type). IaaS is an acronym of Infrastructure as a Service and is a cloud-service-providing model that provides, as a service over the Internet, infrastructure itself for constructing and operating a computer system.

In this type, a data-center operating company operates and manages a data center 203 (corresponding to the cloud server 111). A service provider 120 manages an OS 202 and an application 201. The service provider 120 uses the OS 202 and the application 201, managed by the service provider 120, to provide a service 204.

(Service Type 3: PaaS Usage Type)

Figure 4:
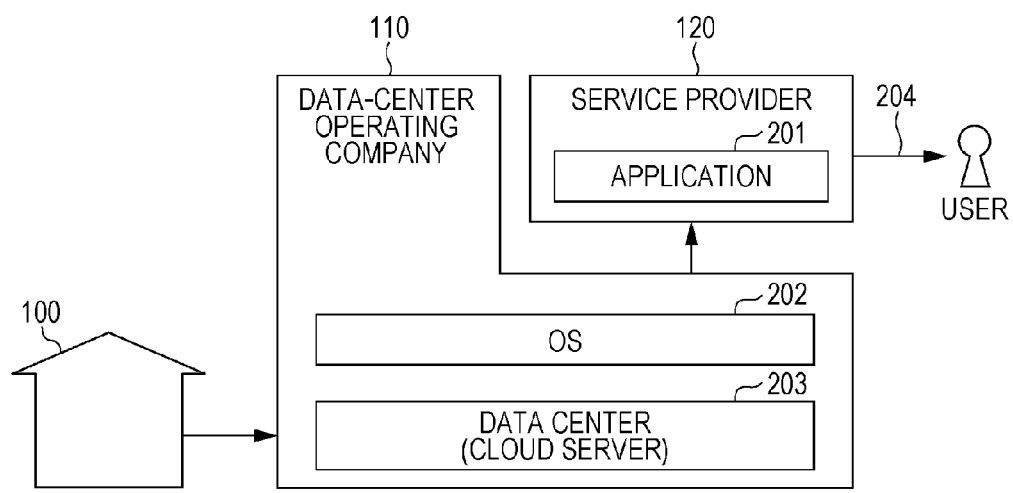
FIG. 4 is a diagram illustrating a third form of the service provided in the configuration method for the sound collection system according to the present disclosure.

FIG. 4 illustrates service type 3 (a PaaS usage type). PaaS is an acronym of Platform as a Service and is a cloud-service-providing model that provides, as a service over the Internet, a platform that serves as a foundation for constructing and operating software.

In this type, a data-center operating company 110 manages an OS 202 and operates and manages a data center 203 (corresponding to the cloud server 111). A service provider 120 manages an application 201. The service provider 120 uses the OS 202, managed by the data-center operating company 110, and the application 201, managed by the service provider 120, to provide a service 204.

(Service Type 4: SaaS Usage Type)

Figure 5:
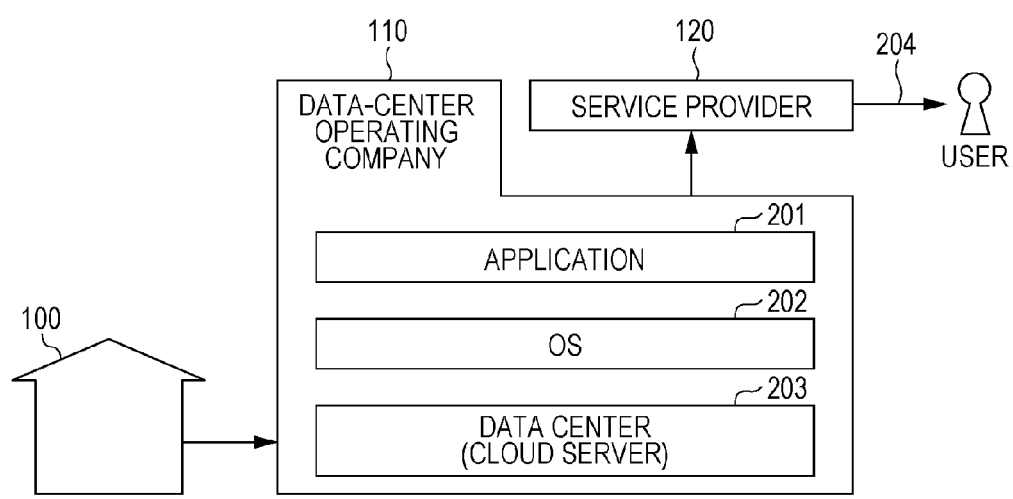
FIG. 5 is a diagram illustrating a fourth form of the service provided in the configuration method for the sound collection system according to the present disclosure.

FIG. 5 illustrates service type 4 (a SaaS usage type). SaaS is an acronym of Software as a Service. SasS is a cloud-service-providing model having, for example, a function that allows companies and individuals (users) that do not own a data center (a cloud server) to use, over a network such as the Internet, applications provided by a platform provider that owns a data center (a cloud server).

In this type, a data-center operating company 110 manages an application 201 and an OS 202 and operates and manages a data center 203 (corresponding to the cloud server 111). The service provider 120 uses the OS 202 and the application 201, managed by the data-center operating company 110, to provide a service 204.

It is assumed that, in any of the types described above, the service provider 120 provides a service. Also, for example, the service provider or the data-center operating company may itself develop the OS, the application, a database for big data, or the like or may also outsource the development to a third party.

The configuration method for the sound collection system is useful for a sound collection system using terminals, such as smartphones, as microphones for a meeting.

What is claimed is:

1. A configuration method used in a server apparatus, the configuration method causing a processor of the server apparatus to execute operations comprising:
   generating a first meeting-determination sound signal corresponding to a first meeting;
   transmitting the first meeting-determination sound signal to a first terminal that belongs to the first meeting;
   causing the first terminal to output the first meeting-determination sound signal;
   causing a second terminal to collect a first external sound when the first terminal outputs the first meeting-determination sound signal;
   receiving, from the second terminal, a first collected-sound signal resulting from a first sound collection of the first external sound performed by the second terminal; and
   determining whether the second terminal belongs to the first meeting, when a degree of first similarity between the first meeting-determination sound signal and the first collected-sound signal received from the second terminal is larger than or equal to a threshold.

2. The configuration method according to claim 1, the operations further comprising:
   generating a first meeting-checking sound signal corresponding to the first meeting when it is determined, in the determining, that the second terminal belongs to the first meeting;
   transmitting, to the second terminal, the first meeting-checking sound signal;
   causing the second terminal to output the first meeting-checking sound signal;
   causing the first terminal to collect a second external sound when the second terminal outputs the first meeting-checking sound signal;
   receiving, from the first terminal, a second collected-sound signal resulting from a second sound collection of the second external sound performed by the first terminal; and
   checking whether a determination, in the determining that the second terminal belongs to the first meeting, is correct in accordance with a degree of second similarity between the first meeting-checking sound signal and the second collected-sound signal received from the first terminal.

3. The configuration method according to claim 2, wherein the second external sound collected by the first terminal includes a voice of a participant in the first meeting.

4. The configuration method according to claim 2, wherein, in the determining
   when the degree of first similarity is lower than the threshold,
   a second meeting is set as a new meeting, and
   it is determined that the second terminal belongs to the second meeting.

5. The method according to claim 2,
   wherein, in the checking, the first meeting-determination sound signal is compared with the first meeting-checking sound signal, which is compared with the second collected-sound signal received from the first terminal, and, when the degree of second similarity is larger than or equal to a threshold, it is determined that the determination is correct.

6. The configuration method according to claim 1, the operations further comprising:
   causing the first terminal to collect a second external sound of a participant in the first meeting;

receiving, from the first terminal, a second collected-sound signal resulting from a second sound collection of the second external sound performed by the first terminal;

performing speech recognition on the second collected-sound signal and creating minutes for the first meeting.

7. The configuration method according to claim 6, the operations further comprising:

transmitting the second collected-sound signal to a third terminal determined to belong to a second meeting different from the first meeting to which the first terminal belongs; and causing the third terminal to output the second collected-sound signal.

8. The configuration method according to claim 1, the operations further comprising:

generating list information indicating a state of the first terminal or the second terminal belonging to the first meeting determined in the determining and transmitting the list information to the first terminal or the second terminal; and causing one of the first terminal or the second terminal, which receives the list information, to display the list information.

9. A server apparatus comprising:

a processor; and a memory that stores a program, the program causing the processor to execute operations including:

generating a meeting-determination sound signal corresponding to a meeting; transmitting the meeting-determination sound signal to a first terminal that belongs to the meeting; causing the first terminal to output the meeting-determination sound signal;

causing a second terminal to collect an external sound when the first terminal outputs the meeting-determination sound signal;

receiving, from the second terminal, a collected-sound signal resulting from a sound collection of the external sound performed by the second terminal;

determining whether the second terminal belongs to the meeting, when a degree of similarity between the meeting-determination sound signal and the collected-sound signal received from the second terminal is larger than or equal to a threshold.

\* \* \* \* \*